United States Patent
Chang et al.

(10) Patent No.: US 6,924,255 B2
(45) Date of Patent: Aug. 2, 2005

(54) COMPOSITION AND METHOD FOR TREATING A SUBTERRANEAN FORMATION

(76) Inventors: Frank F. Chang, 7215 Emerald, Sugar Land, TX (US) 77479; Ronnie L. Thomas, P.O. Box 9818, Dhahran (SA), 31311; Walter D. Grant, 3200 Sunflower Trail, College Station, TX (US) 77845; Wayne W. Frenier, 19111 Cotton Gin Blvd., Katy, TX (US) 77449

( * ) Notice: Subject to any disclaimer, the term of this patent is extended or adjusted under 35 U.S.C. 154(b) by 218 days.

(21) Appl. No.: 09/961,605

(22) Filed: Sep. 24, 2001

(65) Prior Publication Data

US 2002/0070022 A1 Jun. 13, 2002

Related U.S. Application Data

(63) Continuation-in-part of application No. 09/311,690, filed on May 13, 1999, now abandoned.

(51) Int. Cl.[7] .............................. C09K 3/00; E21B 43/16
(52) U.S. Cl. ...................... 507/273; 507/241; 507/260; 507/266; 507/267; 507/277; 507/933; 507/934; 166/300; 166/307
(58) Field of Search ................................. 507/241, 260, 507/266, 267, 273, 277, 933, 934, 936; 166/300, 307; 466/300, 307

(56) References Cited

U.S. PATENT DOCUMENTS

| | | | | |
|---|---|---|---|---|
| 3,828,854 A | * | 8/1974 | Templeton et al. | 166/307 |
| 4,151,878 A | * | 5/1979 | Thomas | 166/307 |
| 4,151,879 A | * | 5/1979 | Thomas | 166/307 |
| 4,160,483 A | * | 7/1979 | Thomas et al. | 166/307 |
| 4,703,803 A | * | 11/1987 | Blumer | 166/300 |
| 5,529,125 A | * | 6/1996 | Di Lullo Arias et al. | 166/307 |
| 6,506,711 B1 | * | 1/2003 | Shuchart et al. | 507/267 |
| 6,531,427 B1 | | 3/2003 | Shuchart et al. | 507/267 |

OTHER PUBLICATIONS

Jones, William C., Investigation of Electropolishing Solution, U.S.C.F.S.T.I., AD Rep. (1965), AD 629912.*

* cited by examiner

*Primary Examiner*—Philip C. Tucker
(74) *Attorney, Agent, or Firm*—Thomas O. Mitchell; Robin Nava; Brigette L. Echols

(57) ABSTRACT

Aqueous liquid compositions for increasing the permeability of a subterranean formation are disclosed, the compositions being characterized by provision of fluoborate anion (fluoboric acid) and a specified compound or compounds, or mixture thereof, which chelate aluminum ions and aluminum fluoride species. Methods of treating a subterranean formation by injection of the composition(s) into the formation are also described.

18 Claims, 15 Drawing Sheets

COMPOSITION AND METHOD FOR TREATING A SUBTERRANEAN FORMATION

This application is a Continuation-in-Part of U.S. patent application Ser. No. 09/311,690 filed May 13, 1999 now abandoned.

BACKGROUND OF THE INVENTION

A. Field of the Invention

The invention relates to compositions and methods for increasing the permeability of a subterranean formation. More particularly, the invention relates to acidizing compositions and methods for their application in subterranean formations comprising siliceous material.

B. Background

Acidizing of siliceous formations by injection of compositions referred to as mud acid is common practice in oilfield operations. As commonly understood, the expression "mud acid" refers to an aqueous base mixture formed by blending hydrofluoric acid (HF) and at least one of hydrochloric acid (HCl), acetic acid ($C_2H_4O_2$), or formic acid ($CH_2O_2$), the most common mixture employed being formed from HF and HCl. Often, if acetic acid or formic acid are the acids combined with the HF, the mud acid is referred to as "organic mud acid". As is well recognized in the art, the origin of the species in the acidizing solution or mixture is not critical, so that a "mud acid", which might be formed by directly blending, e.g., HF and HCl, also is understood to include aqueous mixtures or solutions formed by mixing components which quickly react to form the desired ionic species in the solution or mixture. The ratios and amounts of the acids combined may vary over wide ranges, with the lower limits being more a matter of practicality rather than operability, and the upper limits being a matter of mutual solubility of the acids. Most typically, a mud acid is formed by combining about 3 to about 25 percent HCl and about 1 to about 10 percent HF, both percentages by weight, in aqueous solution, and is typically substantially free of other acidic species. As will be recognized by those skilled in the art, mud acids may also contain, and commonly do, one or more functional additives, such as inhibitors, diverting agents, and/or surfactants.

Although conventional treatments of siliceous clay containing formations with mud acids have generally proven effective for a short time, the improvements in production are frequently short lived. One explanation for this phenomenon is that the mud acid reacts rapidly with the subterranean formation in the vicinity of or near wellbore area, usually the first few inches around the wellbore, thus spending so rapidly that penetration deep into the subterranean formation is not achieved. Subsequently, fines in the subterranean formation migrate into the acidized near wellbore area and replug the area.

One solution to this problem is that taught in U.S. Pat. No. 3,828,854 (Templeton et al) and in the "Introduction" section of Society of Petroleum Engineers Paper No. 5153. The approach taken is the provision, down the wellbore, of a composition or solution which generates HF slowly, so that the solution is placed in contact with the subterranean formation before a significant amount of the HF is generated. The composition is a relatively high pH aqueous solution of a water soluble fluoride salt and at least one water reactive organic acid ester.

U.S. Pat. No. 2,300,393 (Ayers, Jr.) discloses treatment of subterranean formations with fluoboric acid, optionally containing small amounts of HF. Ayers, Jr. also teaches that the fluoboric acid treatment may be followed by HCl containing an inappreciable amount of hydrofluoric acid, or optionally, by a mixture of HCl and fluoboric acids. Again, U.S. Pat. No. 2,425,415 (Bond et al.) describes an acidizing procedure in which the subterranean formation is first contacted with a fluoboric acid solution which does not contain free HF, but which contains an excess of boric acid, followed by contact of the subterranean formation with aqueous fluoboric acid containing excess HF. U.S. Pat. No. 2,663,689 (Kingston el. al.) describes the use of boric acid in aqueous HCl—HF to avoid precipitation of insoluble fluoride salts and fluorosilicic acid. U.S. Pat. No. 4,151,878 (Thomas) is directed to the use of a conventional mud acidizing solution (HCl—HF), followed by fluoboric acid solution. The use of fluoboric acid as an overflush is believed to deter clay migration and thereby significantly reduce or delay production decline which is often otherwise encountered shortly after conventional mud acidizing treatments.

The Thomas patent also describes injection of a fluoboric acid solution, followed by mud acid (HCl—HF) solution. According to the patent, the technique may be used in formations which have a tendency to plug initially upon contact with mud acid, or with HCl commonly used as a preflush ahead of mud acid. When contacted initially with fluoboric acid, such subterranean formations show little or no plugging effects when subsequently treated with mud acid.

However, the Thomas patent does not specifically address formations containing zeolites and chlorites. As will be recognized by those skilled in the art, the use of traditional mud acid is not advisable in subterranean formations which comprise or contain HCl-sensitive materials, e.g., zeolite and chlorites. Additionally, fluoride in the mud acid is believed to bind with aluminum in the subterranean formation and promote deposition of hydrated silica, thereby causing plugging. For example, severe, damaging precipitation of aluminum fluorides during the HF reactions was discovered with formic-HF and acetic-HF fluid systems. See, C. E. Shuchart, et al., "Improved Success in Acid Stimulations with a New Organic-HF System," SPE 36907 presented at 1996 European Petroleum Conference, Milan, Italy. To overcome this problem, Rogers et al. disclosed the use of citric acid as a chelating agent for aluminum to prevent such deposition or formation of hydrated silica gel. The optimum treatment formulation identified therein consisted of 10 percent citric acid and 1.5 percent HF acid, with no additives except corrosion inhibitor. One important disadvantage of this particular method is that the use of hydrofluoric acid primarily addresses damage or scaling in the initial few inches of the subterranean formation around the wellbore, as previously indicated.

Accordingly, there has been a need to extend acidization or stimulation treatment to deeper depths in the formation, e.g., up to a 3 to 5 feet radius from the wellbore, to avoid a rapid decline in production by stabilizing fines and precipitation of acidization products near the wellbore. The invention addresses this need.

C. SUMMARY OF THE INVENTION

The present invention relates to novel acidic compositions useful in treating a well, and to methods for increasing the permeability of a subterranean formation utilizing the compositions as preflush, main, or postflush treatments for the formation. In one embodiment, the invention comprises an aqueous acidic solution or mixture formed by blending an aqueous liquid; fluoboric acid; and an acid, or mixture of acids, which sequester or chelate aluminum ions and aluminum fluoride species, or an ammonium or potassium salt or salts of such acids, or a mixture thereof. In a further embodiment, the composition comprises an aqueous acidic solution or mixture formed or produced by blending an aqueous liquid; a fluoride ion source, as defined, or HF; a boron source; and an acid, or mixture of acids, which chelate aluminum ions and aluminum fluoride species, or an ammonium or potassium salt or salts of such acids, or a mixture thereof. As utilized herein, the expression "fluoride ion source" is taken as referring to a compound or compounds, other than HF, or aqueous solutions of the compound or compounds, that will provide fluoride ion or ions in an aqueous liquid. Similarly, the term "boron source" is considered to define a compound or compounds, or an aqueous solution of the compound or compounds, providing boron ions or boron-containing anions which are reactive with an aqueous liquid or a component in the aqueous liquid to form the $BF_4^-$ anion in the aqueous liquid.

In a principal embodiment, therefore, the invention relates to a composition useful for treating a subterranean formation comprising an aqueous acidic solution or mixture formed by blending an aqueous liquid; a fluoride ion source; a boron source; and an acid, or mixture of acids, which chelate aluminum ions and aluminum fluoride species, or an ammonium or potassium salt or salts of such acids, or a mixture thereof, and to a method of treating a subterranean formation utilizing the composition. In a preferred aspect of this embodiment, the fluoride ion source is selected from ammonium bifluoride and ammonium fluoride, and mixtures thereof, the boron source is boric acid, and the acid which chelates aluminum ions and aluminum fluoride species is selected from polycarboxylic acids, polyaminopolycarboxylic acids, and monoaminopolycarboxylic acids. In one very preferred aspect of this embodiment, the fluoride ion source is ammonium bifluoride, the boron source is boric acid, and the acid which chelates aluminum ions and aluminum fluoride species is selected from citric acid, malic acid, 2-hydroxyethyliminodiacetic acid, N-(2-hydroxyethyl)ethylenediaminetriacetic acid, and mixtures thereof.

In another embodiment of the invention, the composition is formed by blending an aqueous liquid; HCl in specified amount; a fluoride ion source; a boron source; and an acid, or mixture of acids, which chelate aluminum ions and aluminum fluoride species, or an ammonium or potassium salt or salts of such acids, or a mixture thereof, and to a method of treating a subterranean formation utilizing the composition. Preferably, the fluoride ion source is selected from ammonium bifluoride and ammonium fluoride, and mixtures thereof, the boron ion source is boric acid, and the acid which chelates aluminum ions and aluminum fluoride species is selected from polycarboxylic acids, polyaminopolycarboxylic acids, and monoaminopolycarboxylic acids. In one very preferred aspect, the fluoride ion source is ammonium bifluoride, the boron ion source is boric acid, and the acid which chelates aluminum ions or aluminum fluoride species is selected from citric acid, malic acid, 2-hydroxyethyliminodiacetic acid, N-(2-hydroxyethyl)ethylenediaminetriacetic acid, and mixtures thereof.

In a further embodiment, the invention relates to a composition useful for treating a subterranean formation comprising an aqueous acidic solution or mixture formed by blending an aqueous liquid; HF; a boron source; and a compound or compounds which chelate aluminum ions and aluminum fluoride species, and to a method of treating a subterranean formation utilizing the composition. Preferably, the boron source is boric acid, and the compound (s) which chelate aluminum ions or aluminum fluoride species are selected from polycarboxylic acids, polyaminopolycarboxylic acids, and monoaminopolycarboxylic acids. In one very preferred aspect of this embodiment, the boron source is boric acid, and the compound which chelates aluminum ions or aluminum fluoride species is selected from citric acid, malic acid, 2-hydroxyethyliminodiacetic acid N-(2-hydroxyethyl)ethylenediaminetriacetic acid and mixtures thereof.

In their most preferred aspects, the acid treatment compositions of the invention also include non-interfering ionic species in a concentration or concentrations in the aqueous mixture effective to provide a level, or increase the ionic strength of the composition to a level, sufficient to inhibit migration of clay particles in a subterranean formation when the aqueous mixture is applied to or injected into the subterranean formation. The non-interfering ionic species may be derived from precursor compositions employed in preparing the compositions of the invention, or may be provided by addition of a non-interfering soluble salt or salts during formulation of the compositions of the invention. As understood herein, the term "non-interfering", in referring to the ionic species, simply indicates that the ionic species do not interfere to any significant extent with the formulation of, or desired treatment function(s) of the compositions of the invention, while the term "soluble" indicates that any compound or compounds added, or non-interfering species present in the aqueous mixtures, have sufficient solubility in the aqueous mixture to provide the desired concentration level. Preferably, the total ionic strength of the compositions of the invention will range from 2 percent to 10 percent, most preferably from 3 percent to 7 percent, all percentages by weight. Thus, in the case where the invention comprises an aqueous solution or mixture formed by blending an aqueous liquid; fluoboric acid; and an acid, or mixture of acids, which chelate aluminum ions and aluminum fluoride species, or an ammonium or potassium salt or salts of such acids, or a mixture thereof, ionic species, such as may be provided by addition of at least one non-interfering soluble salt, e.g., $NH_4Cl$, or KCl, may be present in a concentration effective to provide an ionic strength of the invention composition sufficient to inhibit clay particle migration. Where the invention composition is formed by blending an aqueous liquid; a fluoride ion source; a boron source; and an acid, or mixture of acids, which chelate aluminum ions and aluminum fluoride species, or an ammonium or potassium salt or salts of such acids, or a mixture thereof, the concentration of non-interfering soluble ionic species may be derived sufficiently from the compositions or precursors utilized to formulate the compositions of the invention, or appropriate salt(s) may be added in a concentration effective to increase the ionic strength of the composition to a level sufficient to inhibit clay particle migration. In the case where the composition is formed by blending an aqueous liquid; HCl in specified amount; a fluoride ion source; a boron source and an acid, or mixture of acids, which chelate aluminum ions and aluminum fluoride species, or an ammonium or potassium salt or salts of such acids, or a mixture thereof, non-interfering soluble salt species may be provided or added to the mixture in a concentration effective to insure that the ionic strength of the composition is at a level sufficient to inhibit clay particle migration. This will also be the case where the compositions of the invention are formed by blending an aqueous liquid; HF; a boron source; and an acid, or mixture of acids, which chelate aluminum ions and aluminum fluoride species, or an ammonium or potassium salt or salts of such acids, or a mixture thereof.

An important aspect of the invention is the requirement of low pH for the compositions of and method of the invention, i.e., the compositions are acidic and are employed as such. The compositions will thus be blended with at least the components specified, but may also be formulated by further addition of an amount of a non-interfering acid, or acids, sufficient to insure pH levels in the acid range, preferably strong acid range. Low pH is considered to aid in maintaining Si and Si species in solution.

As indicated, the invention further includes the use of each composition disclosed in a method for treating a subterranean formation to increase the permeability thereof. The terms "treating" or "treatment" are taken herein, as indicated, to include preflush, main or acidizing, or postflush treatments, permeability increase being achieved by reaction with or dissolution of components of the formation. In treating a subterranean formation, the compositions are commonly injected into the formation at a pressure referred to as matrix pressure and allowed to react with or dissolve the minerals or components composing the formation, in amount sufficient or effective to increase the permeability of the formation.

D. BRIEF DESCRIPTION OF THE DRAWINGS

E. DETAILED DESCRIPTION OF THE INVENTION

Figure 1:
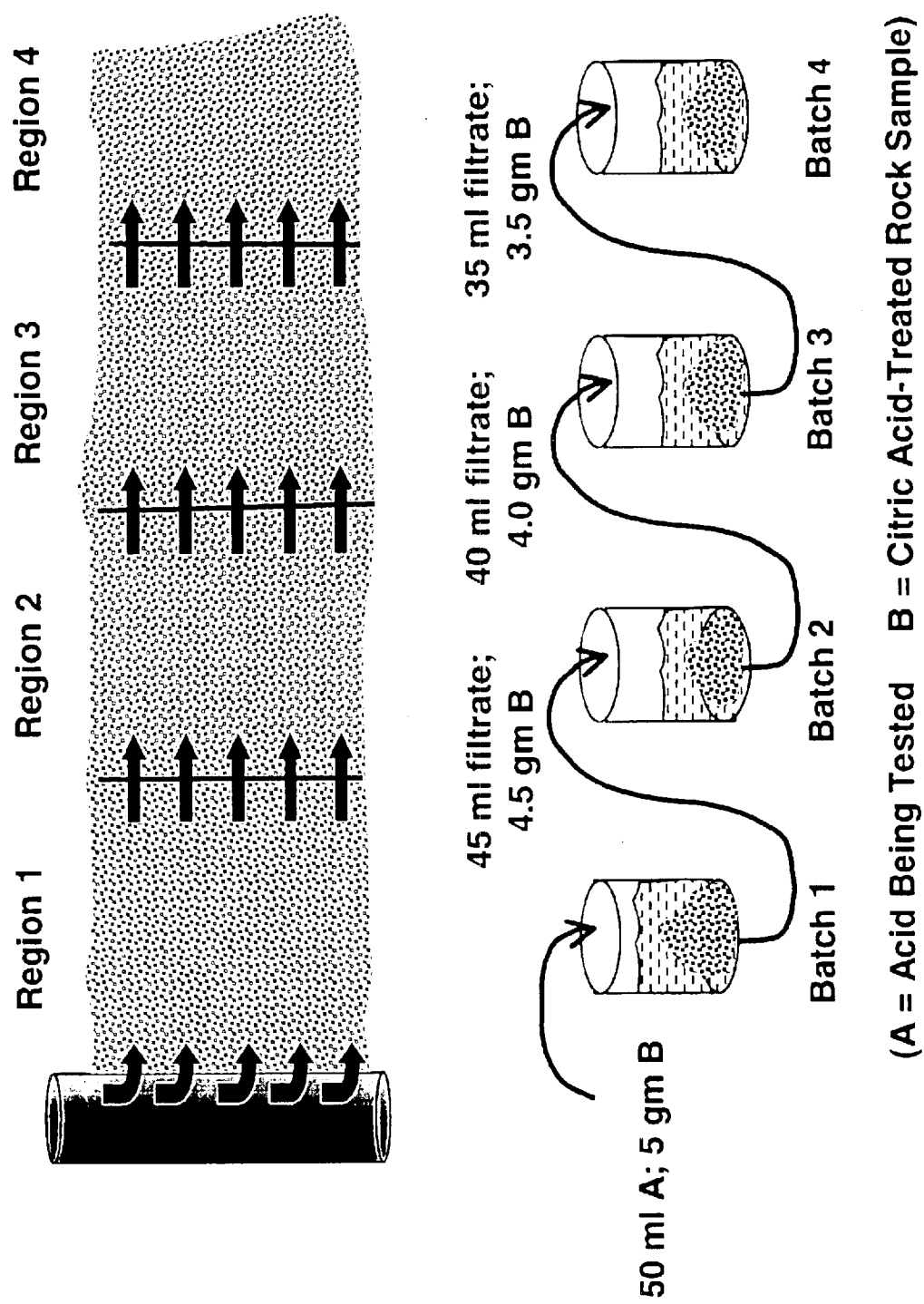
FIG. 1 illustrates sequential acid spending testing designed to simulate acid solution penetrating a subterranean formation.

In general, as indicated, compositions according to the invention may be prepared by mixing the required components in an aqueous liquid. The expression "aqueous liquid" is understood as including a wide spectrum of water-based liquids, including, but not limited to, fresh water, sea water, dilute acids, and brines, so long as any components of the aqueous liquid do not interfere significantly with the formation of or performance of the compositions of the invention. Additionally, as also indicated, one or more of the precursor compounds or compositions may first be blended with or dissolved in an aqueous liquid, if desired, before blending with aqueous liquid and one or more components to form the compositions of the invention. As will be recognized by those skilled in the art, the aqueous liquid of the invention may contain additives, inhibitors, etc., as are common in formation treatment procedures.

The sequence of blending the components of the aqueous acidic mixture of the invention is not critical, i.e., the components or aqueous solutions thereof may be blended in any desired order or sequence. Preferably, however, in the embodiments of the invention where a boron source is to be blended in the aqueous liquid, and where the boron source is of limited solubility, the acid, etc. chelant for aluminum and aluminum fluoride species and the fluoride ion source, or HF, are blended first with the aqueous liquid, followed by the blending or addition of the boron source. For example, the desired amounts of citric acid or N-(2-hydroxyethyl) ethylenediaminetriacetic acid (HEDTA) and ammonium bifluoride may be mixed with fresh water in a mixing vessel until dissolved. Thereafter, a boron source, such as boric acid, may be added to the vessel. The boric acid is preferably added last since it does not easily dissolve in fresh water, but will readily be taken up by the acid-containing solution. Although the compositions may be blended offsite, they will normally be blended at the surface proximate the well site, or on the fly, and pumped downwell to the site selected for treatment, which may be isolated by suitable means, as is known in the art. Alternatively, they may be blended as concentrates, and then diluted at the well site, either on the surface, or on the fly. Compositions or solutions according to the invention may be used at temperatures ranging from about 20° C. to about 170° C.

As will be understood by those skilled in the art, blending of the components or compounds specified herein in aqueous liquid gives rise to chemical reactions in the aqueous liquid, to the effect that, in each embodiment, a complex mixture of ionic species is produced in the aqueous liquid.

Exemplary formulation reaction equations, which, in the case of equation (1), illustrates the equilibrium reaction for hydrolysis of fluoboric acid, are shown, as follows:

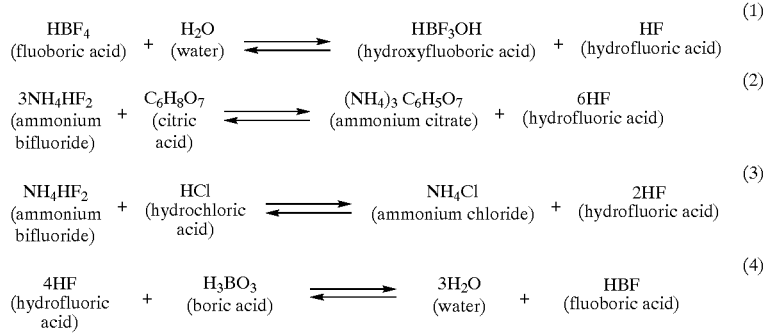

As shown by the reverse arrows, and as will be understood by those skilled in the art, the reactions will reach equilibrium, so that, for example, as shown by equation (4), a small concentration of HF will be present in the aqueous mixture. In the second reaction shown, citric acid, while also used herein as a chelating agent for aluminum and aluminum fluoride species, provides the hydrogen ions for the production of HF.

A key feature of the invention is, of course, the injection of the compositions described into the subterranean formation and penetration thereof to a greater depth before spending. This is believed accomplished by the presence of the $BF_4^-$ (fluoborate) species in the aqueous liquid, which may be said to generate acid species slowly "in situ", i.e., at or in the subterranean formation, which attack the silica, silicates, and aluminosilicates in the formation. In conventional terminology, and with reference to the equations provided, fluoboric acid in the aqueous liquid is considered to hydrolize slowly, forming HF in the liquid, which attacks silica in the formation. As the HF is spent in acidizing the formation, the equilibrium will be shifted to the right in the reaction illustrated in equation (1) in order to generate more HF to replace that spent.

As will be appreciated by those skilled in the art, and with reference to equations 2 through 4, the blending of, in aqueous liquid or solution, at or by achievement of appropriate pH, a fluoride ion source, a boron source, and an acid, or mixture of acids, which chelate aluminum ions and aluminum fluoride species, or an ammonium or potassium salt or salts of such acids, or a mixture thereof, will produce the fluoborate anion (fluoboric acid) in the aqueous liquid. Additionally, HCl, a fluoride ion source, a boron source, and an acid, or mixture of acids, which chelate aluminum ions and aluminum fluoride species, or an ammonium or potassium salt or salts of such acids, or a mixture thereof, will also produce the fluoborate anion (fluoboric acid) in the aqueous liquid. Similarly, HF and a boron source will also produce the fluoborate anion (fluoboric acid) in the aqueous liquid. Accordingly, the various embodiments of the invention are linked in that all require an aqueous acidic liquid containing or comprising fluoborate anion (fluoboric acid), no matter how supplied, and also formed with an acid, or mixture of acids, which chelate aluminum ions and aluminum fluoride species, or an ammonium or potassium salt or salts of such acids, or a mixture thereof.

Within the limits of practical operation, the concentration of the fluoborate anion (fluoboric acid) in the aqueous liquid is not critical. In the embodiments of the invention wherein the $BF_4^-$ anion (fluoboric acid) is prepared or formed in the aqueous liquid, the concentrations of the components or reactants blended in the aqueous liquid will be apportioned in amounts effective to obtain or provide the desired concentration of the $BF_4^-$ anion (fluoboric acid) in the aqueous liquid. For example, wherein the fluoboric acid is formed by reaction of a fluoride ion source, such as ammonium bifluoride, a boron source, such as boric acid, and an acid, or mixture of acids, which chelate aluminum ions and aluminum fluoride species, or an ammonium or potassium salt or salts of such acids, or a mixture thereof, such as citric acid or N-(2-hydroxyethyl)ethylenediaminetriacetic acid, the fluoride ion source, the boron source, and an acid, or mixture of acids, which chelate aluminum ions and aluminum fluoride species, or an ammonium or potassium salt or salts of such acids, or a mixture thereof, are preferably, though not necessarily, blended in stoichiometric or approximately stoichiometric amounts or concentrations. In the aspect of the invention wherein HCl, a fluoride ion source, a boron source, and an acid, or mixture of acids, which chelate aluminum ions and aluminum fluoride species, or an ammonium or potassium salt or salts of such acids, or a mixture thereof, are provided or blended in aqueous liquid, the HCl and the fluoride ion source are preferably provided in approximately stoichiometric amounts, and an acid, or mixture of acids, which chelate aluminum ions and aluminum fluoride species, or an ammonium or potassium salt or salts of such acids, or a mixture thereof, may be provided in lesser amounts, if desired. Again, in the embodiment of the invention utilizing HF, the HF and boron source may be supplied in stoichiometric or approximately stoichiometric amounts, and the compound or compounds which chelate aluminum ion and aluminum fluoride species, need not be in such concentration. Accordingly, as will be understood by those skilled in the art, the ratios and concentrations of the components or reactants may be varied extensively, so long as the aqueous liquid contains an amount or concentration of the $BF_4^-$ anion (fluoboric acid), which, when supplied in sufficient volume or amount in or to the subterranean formation, is effective to increase the permeability of a subterranean formation. Generally, the concentrations of fluoboric acid blended with or formed in the aqueous liquid employed are those effective to achieve an observable improvement in stabilization of the clays and fines in the remote areas of the formation. Such a stabilizing effect can be recognized by improved production over a more prolonged period of time than would have been predicted based on previous experience in that field, or, for example, by laboratory techniques such as core flow tests or by examination of a formation sample using a scanning electron microscope as discussed in Society of Petroleum Engineers Paper No. 6007. Preferably, treatment compositions, once the starting ingredients have been mixed and dissolved in aqueous liquid or water, which contain from about 1 weight percent or less up to about 20 weight percent $BF_4^-$, basis $HBF_4$, may be employed. More preferably, the treatment composition comprises from about 2 to about 10 weight percent $BF_4^-$, basis $HBF_4$. Unless otherwise specified, or evident from context, all component percentages expressed hereinafter are by weight, based on the total weight of the component and the rest of the mixture.

In the embodiment wherein HF and a boron source are used to form fluoboric acid in the aqueous liquid, the relative concentrations or ratios of boron source, e.g., boric acid, and hydrofluoric acid used in preparing the mixture can be adjusted to tie up all of the free hydrofluoric acid (e.g. as the reaction product of fluoboric acid) or to leave some excess hydrofluoric acid (e.g. unreacted with the boron source). By adjusting the relative amounts of hydrofluoric acid to boron source in the mixture, fine tuning of the amount of free hydrofluoric acid in the composition of the invention may be achieved. Where excess HF is present, the amount of excess HF will preferably be less than about 1 percent.

In general, the components used in formulating the compositions of the invention are known and may be obtained from commercial chemical sources, or they may be prepared by well known procedures. For example, fluoboric acid, HF, HCl, various fluoride ion sources, such as ammonium bifluoride, various acids or ammonium or potassium salts which chelate aluminum or aluminum fluoride species, such as citric acid and N-(2-hydroxyethyl) ethylenediaminetriacetic acid, and various boron sources, such as boric acid, may be obtained readily. Commercial grade components may be utilized, of standard strengths available, so long as any extraneous species present therewith do not interfere significantly with the formulation of or function of the compositions of the invention. As used herein, the expression "aluminum fluoride species" refers to aluminum and fluorine-containing anions formed by reactions of one or more components of the aqueous liquid with components of the subterranean formation. Assuming that the principal reaction is, as conventionally understood, with HF from the fluoboric acid in the aqueous fluid, the reaction equation is shown, as follows:

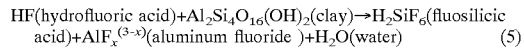

$$HF(\text{hydrofluoric acid}) + Al_2Si_4O_{16}(OH)_2(\text{clay}) \rightarrow H_2SiF_6(\text{fluosilicic acid}) + AlF_x^{(3-x)}(\text{aluminum fluoride}) + H_2O(\text{water}) \quad (5)$$

wherein x is a number from 1 to 6.

Actually, this is believed to be only the initial stage of a complex reaction sequence. Depending on the free fluoride concentration, aluminum fluorides are believed present as $Al^{3+}$, $AlF^{2+}$, $AlF_2^+$, $AlF_3$, $AlF_4^-$, $AlF_5^{2-}$, and $AlF6^{3-}$. Silicon fluorides may exist as $SiF_4$, $SiF_5^{1-}$, and $SiF_6^{2-}$.

The silicon fluorides and more-fluoride-rich aluminum species are believed to react with additional clay, extracting aluminum and perhaps precipitating hydrated silica. For example, fluosilicic acid may react with additional clay to yield a hydrated silica, i.e., silica gel, a soluble aluminum fluoride species and other byproducts as follows:

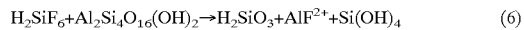

$$H_2SiF_6 + Al_2Si_4O_{16}(OH)_2 \rightarrow H_2SiO_3 + AlF^{2+} + Si(OH)_4 \quad (6)$$

The reaction of equation (5) is referred to as the primary reaction and the reaction of equation (6) as the secondary reaction. Silica precipitation may occur according to equation (6).

Importantly, several embodiments of the invention composition further include an effective amount of an acid, or mixture of acids, which chelate aluminum ions and aluminum fluoride species, or an ammonium or potassium salt or salts of such acids, or a mixture thereof. As also indicated, in the case where HF is employed in formulating the invention composition, a greater variety of sequestering compounds may be employed. While not wishing to be bound by any theory of invention, it is believed that the sequestering of the aluminum and/or aluminum fluoride species by the acid(s), or ammonium or potassium salt(s) thereof, or sequestering compound or compounds, frees fluoride ions to associate in solution with Si ions and maintain the solubility thereof.

Preferably, any acid, or ammonium or potassium salt thereof, which sequesters or chelates aluminum, or aluminum fluoride species, may be employed in formulating the compositions of the invention. The expression "acid, or mixture of acids, which chelate aluminum ions and aluminum fluoride species, or an ammonium or potassium salt or salts of such acids, or a mixture thereof" is understood as including an acid of the type described, a mixture of such acids, the ammonium salt of and a mixture of ammonium salts of such acids, the potassium salt of and a mixture of potassium salts of such acids, and any mixture of such acids and ammonium or potassium salts of such acids. Where mixtures of the acid, acids, salt, compounds etc. are provided or employed in the blending, they may be employed in any suitable proportions or ratios, with the provision, as discussed hereinafter, that appropriate pH control and solubility factors are taken into account. Preferred sequestering agents are polycarboxylic acids, such as tricarboxylic acids; polyaminopolycarboxylic acids (defined here as having more than one amine group that is substituted by at least one carboxylic acid); and monoaminopolycarboxylic acids (defined here as having no more than one amine group, the amine group substituted by more than one carboxylic acid); and the ammonium or potassium salts thereof. Particularly preferred acids are citric acid, nitrilotriacetic acid (a monoaminopolycarboxylic acid), 2-hydroxyethyliminodiacetic acid (HEIDA, a monoaminopolycarboxylic acid), malic acid, tartaric acid, and N-(2-hydroxyethyl)ethylenediaminetriacetic acid (a polyaminopolycarboxylic acid). As indicated, the chelating agent will be supplied in an effective amount, i.e., an amount sufficient or effective to chelate aluminum or aluminum fluoride species which may become available during application of the invention. The chelating agent may thus be employed in varying amounts depending on whether or not it also performs the function of supplying hydrogen ion, and, in such cases, the chelating agent will be supplied in an amount sufficient to achieve the desired or required hydrogen ion concentration, which may be more than the amount needed for chelation. In one of the preferred aspects of the invention, wherein ammonium bifluoride is blended in aqueous solution and citric acid or N-(2-hydroxyethyl) ethylenediaminetriacetic acid provides citrate or N-(2-hydroxyethyl)ethylenediaminetriacetate ion for sequestering or chelating aluminum ion or aluminum fluoride species, the citric acid or N-(2-hydroxyethyl)ethylenediaminetriacetic acid may also provide sufficient hydrogen ion for production of HF.

Sodium salts of the acids of the invention could also be used, taking into account the lower solubility of NaF.

As indicated, low pH is an important aspect of the compositions and method of the invention. In general, the compositions should be formulated or blended to have a pH below 3, preferably 2 or below, most preferably below 1.5 or 1.0. Suitable addition or blending of a non-interfering acid, e.g., HCl, may be employed to insure the desired low pH levels. Generally, the sequestering agent should have a solubility of at least 1 percent, preferably 1 to 10 percent, at 25° C. and a pH of 3 or less.

As indicated, the boron source comprises a compound, or mixtures thereof, or a solution of the compound or compounds with an aqueous liquid, providing boron ions or boron-containing anions which are reactive with a component of the aqueous liquid to form $BF_4$ anion in the aqueous liquid. Suitable boron sources include boric acid, boron halides, boron hydrides, and metal borates, such as alkali metal borates.

The compositions of the invention are particularly suited for acidizing sandstone formations containing high silt and clay content and HCl-sensitive minerals, such as zeolites and chlorites. As indicated, the matrix stimulation compositions of the invention may be used as (1) a preflush, (2) the main acid treatment, or (3) as a postflush.

The compositions of the invention remove formation damage caused by clay and other aluminosilicate minerals. They also minimize hydrated silica precipitation, as a result of the chelating component specified. Fines are also prevented from migrating as a result of the deposition of a coating of borosilicates and silicates, which fuse the fines to each other and to the sand matrix of the formation. This coating is also useful during a preflush application to desensitize the HCl-sensitive minerals by coating them and thereby protecting them from the adverse effects of HCl.

In a typical treatment, a preflush such as toluene, xylene, or the like may be employed, if desired, to clean the wellbore and surrounding formation of organic deposits such as paraffins or asphaltines. Optionally, the preflush to remove organic deposits may be followed by a preflush of HCl or an organic acid to dissolve carbonates in the formation. Where the formation is acid sensitive, i.e., susceptible to an initial decrease in permeability upon contact with HCl, fluoboric acid is beneficially employed as the preflush, as taught in U.S. Pat. No. 4,151,878, hereby incorporated by reference.

When any desired preflushes have been completed, a suitable volume of the composition of the invention is injected in a conventional manner as the main acidizing composition at a matrix rate, i.e., at a rate which does not fracture the formation.

In a situation wherein a composition of the invention is used for the main acidizing treatment, a preferred treatment sequence is as follows:

1. Circulation and establishment of infectivity with ammonium chloride brine.
2. Injection of an aqueous solution containing 5 percent ammonium chloride and 10 percent of a mutual solvent such as ethylene glycol monobutylether.
3. Preflush with an aqueous solution containing 10 percent glacial acetic acid.
4. Injection of the matrix stimulation fluid (the composition of the invention), with an optional shut-in period.
5. Overflush or postflush with an aqueous solution containing 5 percent by weight ammonium chloride or 10 percent glacial acetic acid.
6. Flowback.

EXAMPLE 1

To illustrate the preparation of a composition of the invention, and how the concentration of HF may be fine tuned, the following procedure was conducted. About 3 wt % hydrofluoric acid (HF, MW=20), about 10 wt % citric acid, and water are mixed together to form a pre-composition blend or mixture. About 1.2 wt % boric acid (MW=61.8) is then blended with the mixture. Reaction of the boric acid with HF in the mixture results in the production of fluoboric acid, and reduces the free HF concentration to about 1.5 wt % in the final mixture. As will be appreciated, in order to remove 1.5 wt % (0.75 molar) HF from a 3 wt % (1.5 molar) HF solution by reaction with boric acid to form fluoboric acid (MW=87.8), a concentration of 0.188 molar boric acid is required in the mixture. That is, for every 4 moles of HF, 1 mole of boric acid ($H_3BO_3$) is required in the reaction mixture to produce 1 mole of fluoboric acid (eq. 4). Therefore, about 1.16 wt % of boric acid in a mixture with about 3 wt % HF, will leave about 1.5 wt % free HF acid in the composition. Similarly, if only about 1 wt % free HF is desired when starting with about 3 wt % HF, about 2 wt % HF needs to be reacted with the boric acid. About 1.54 wt % of boric acid in a mixture with about 3 wt % HF solution would leave about 1 wt % free HF in the composition. When using a composition of the present invention comprising about 1.5 wt % free HF and fluoboric acid, the formation reaction capacity of this system is dramatically increased over that of a conventional 1.5% HF solution, because as free HF is spent on the formation, additional HF can be generated in the formation through hydrolysis of the fluoboric acid. Advantageously, however, the formation never "sees" excessive HF acid concentration.

As mentioned, compositions of the present invention can be formulated at high acid concentration and diluted on site during the treatment implementation. Such dilution of the composition can permit the treatment to be pumped at higher rates (e.g., 6–10 BPM). The overall volume of the treatment can be reduced due to the ability to add the hydrofluoric acid to the formulation at higher concentration (e.g. in the form of fluoboric acid), without damaging the formation.

In the following additional examples, exemplary compositions according to the invention are referred to as New Acid and New Acid II. Unless expressed otherwise or evident from the context, all percentages of components of mixtures expressed hereinafter are by weight, based on the total weight of the mixture including the component.

New Acid was prepared by mixing about 13.4 percent citric acid, about 9.8 percent ammonium bifluoride, and about 4.9 percent boric acid in fresh water. The ammonium bifluoride and the citric acid react (reaction 2) to form hydrogen fluoride in solution, which reacts with the boric acid. There is thus formed an aqueous solution containing various ionic species, including fluoborate ion and citrate ion.

New Acid II was prepared by mixing about 13.4 percent N-(2-hydroxyethyl)ethylenediaminetriacetic acid, about 9.8 percent ammonium bifluoride, and about 4.9 percent boric acid in fresh water. The ammonium bifluoride and the HEDTA react to form hydrogen fluoride in solution, which reacts with the boric acid. There is thus formed an aqueous solution containing various ionic species including fluoborate ion and N-(2-hydroxyethyl)ethylenediaminetriacetate ion.

EXAMPLE 2

Five samples from a sandstone subterranean formation in South America containing 58% quartz, 12% plagioclase, 4% calcite, 20% chlorite, and 6% smectite were prepared. The samples were then individually contacted with aqueous solutions comprising or formulated, as follows: 12/3 HCl/HF, 9/1 HCl/HF, 3/1 HCl/HF, fluoboric acid, and New Acid. The starting ingredients of the acid compositions are shown in Table 1.

TABLE 1

|  | New Acid | Fluoboric acid | 12/3 mud acid | 9/1 mud acid | 3/1 mud acid |
|---|---|---|---|---|---|
| Water (ml) | 97.0 | 69.9 | 37.5 | 76.0 | 90.7 |
| 37% HCl (ml) | 0.0 | 18.2 | 62.4 | 23.9 | 9.2 |
| Ammonium bifluoride (NH$_4$HF$_2$) (g) | 9.8 | 12.0 | 4.8 | 1.5 | 1.5 |
| Boric acid (H$_3$BO$_3$)(g) | 4.9 | 6.0 | 0.0 | 0.0 | 0.0 |
| Citric Acid (C$_6$H$_8$O$_7$) (g) | 13.4 | 0.0 | 0.0 | 0.0 | 0.0 |

Procedure

For each acid solution to be tested, a sequential spending test was performed to simulate the process of the acid penetrating into a subterranean formation and reacting with formation rock that had been preflushed with 10% citric acid. The testing procedure is depicted in FIG. 1. Initially, a large portion of rock was contacted with 10% citric acid preflush for 1 hour. This rock was separated from the preflush, and portions were treated individually, as follows. (These samples collectively were representative of a formation that had been treated with 10% citric acid, and they were then used to simulate regions of the formation, successively farther away from the wellbore, that were treated with the acid being tested.) A 50 ml sample of a fresh solution of the acid being tested was loaded into a plastic bottle and heated to about 71° C. Five grams of the 10% citric acid treated sample was added to the bottle and allowed to react with the acid for 1 hour. The spent acid in this first batch (batch #1) was filtered out, and a 5 ml filtrate sample was extracted for ion analysis. This first batch represented a region of the formation nearest the wellbore (designated Region 1 in FIG. 1). A second sample of 4.5 grams of the 10% citric acid treated sample was added to the remaining 45 ml of filtrate of the acid being tested. This batch was designated as batch #2 and simulated spent acid from Region 1 penetrating further into the subterranean formation and contacting a portion of the formation (Region 2 in FIG. 1) that had not yet been contacted with the acid being tested. After one hour, the spent acid from batch #2 was filtered out, and a 5 ml filtrate sample was extracted for ion analysis. A third batch of 4.0 grams of the 10% citric acid treated sample was added to the remaining 40 ml of filtrate. This batch was designated as batch #3. It was then handled as the previous batches had been handled, and finally a similar procedure was used for batch #4 made from 3.5 grams of the 10% citric acid treated sample and 35 ml of the filtrate from batch #3.

Figure 2:
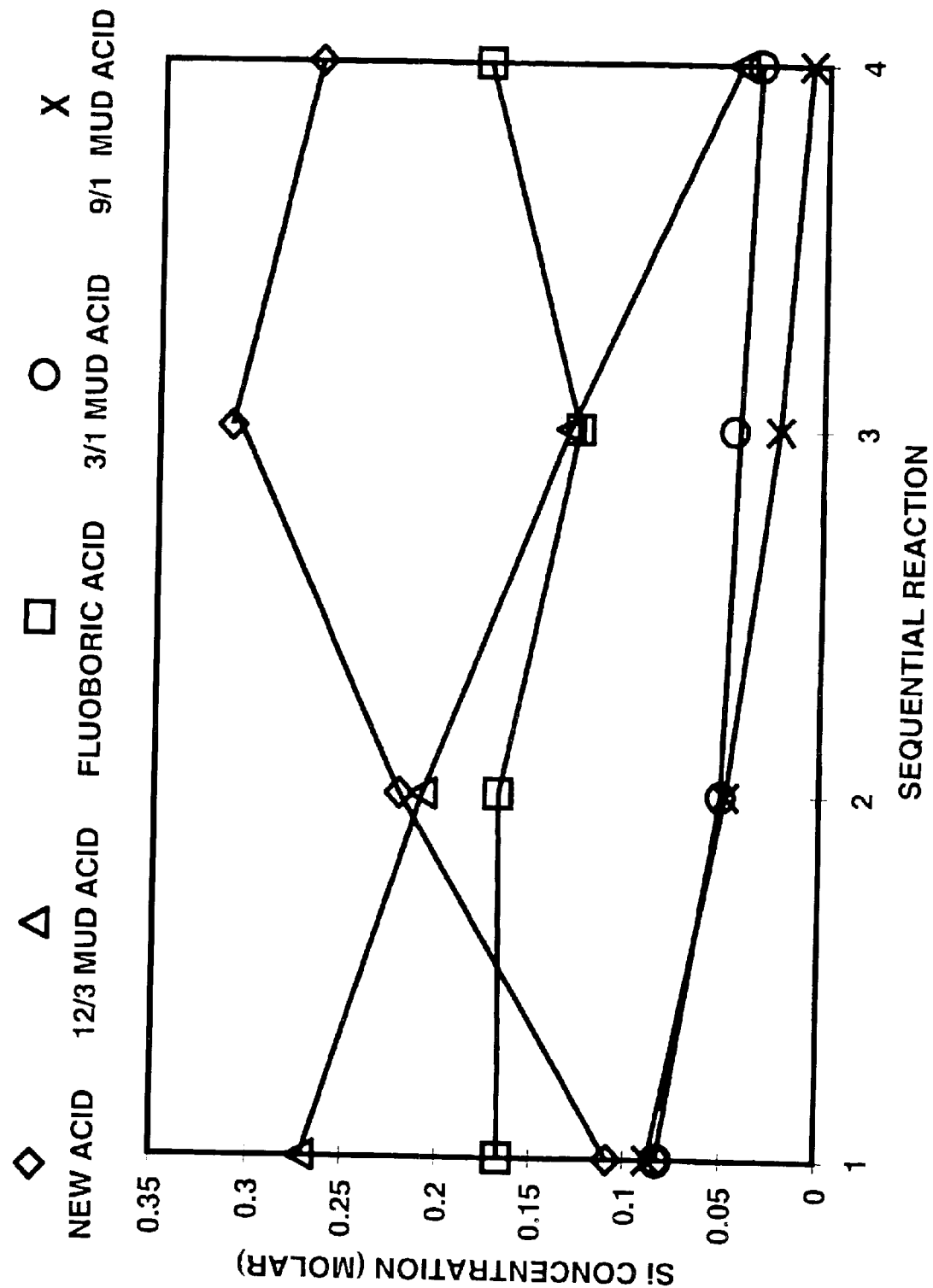
FIG. 2 is a graph illustrating silicon ion concentration in sequential spending effluents at 77° C.

FIG. 2 indicates that as the mud acids penetrate into a formation, spent acid comes into contact with fresh subterranean formation minerals, and the concentration of silicon ions is reduced. The fluoboric acid's capability of slowly generating HF to continue dissolve aluminosilicate minerals renders a flat profile as dissolution and precipitation processes reach equilibrium. The New Acid system results indicate dramatically improved Si ion concentrations away from the near wellbore area.

Figure 3:
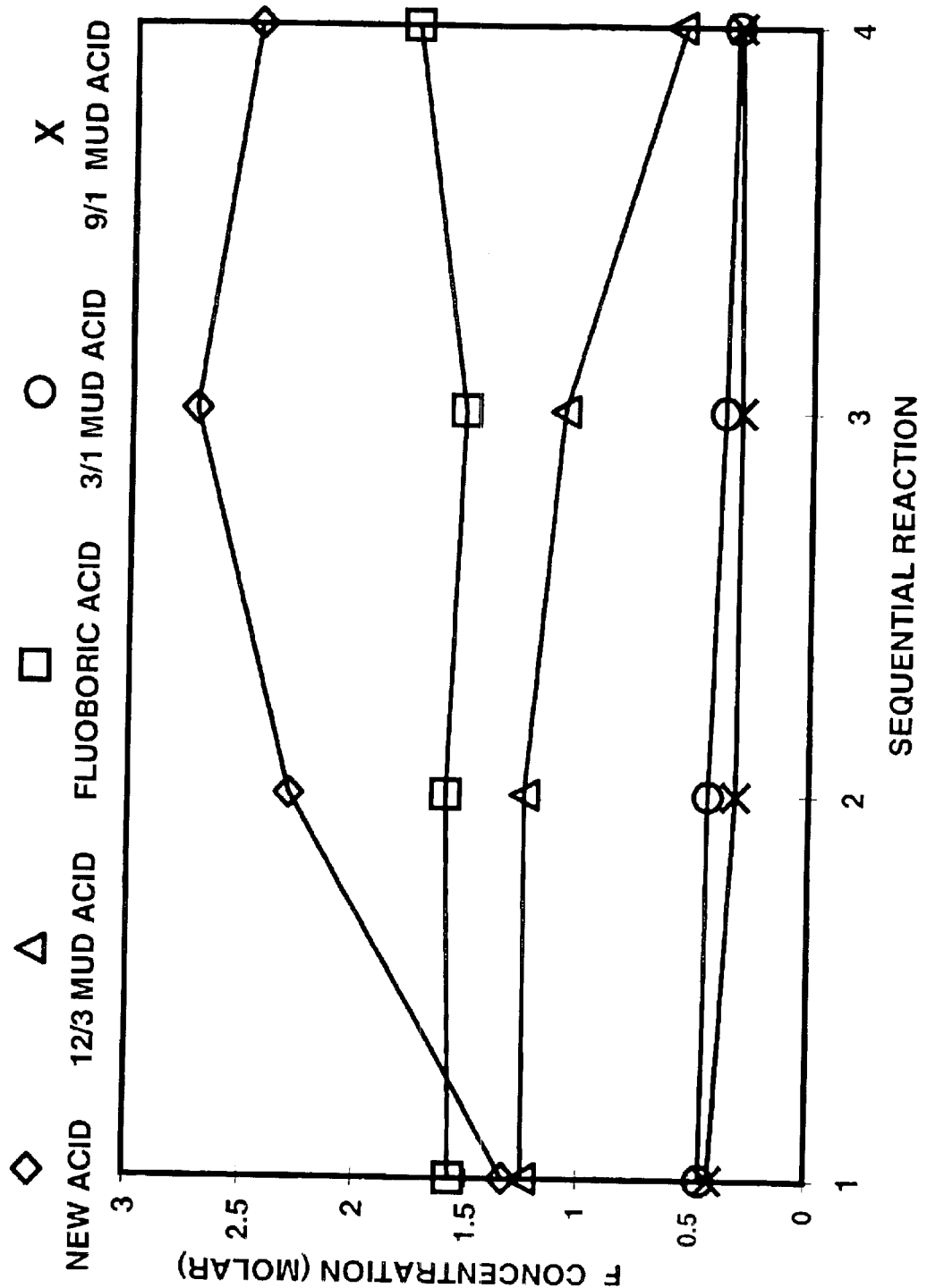
FIG. 3 is a graph illustrating fluoride ion concentration in sequential spending effluents 77° C.

FIG. 3 shows the fluoride concentrations in the spent acid solutions of the 12/3 HCl/HF, 9/1 HCl/HF, 3/1 HCl/HF, fluoboric acid, and New Acid. The mud acids generated fluoride rapidly, so the fluoride concentration reached a plateau. However, the New Acid generated fluoride ions slowly, since they are generated principally by the reaction between the HF generated from the fluoborate species in the solution and the minerals in the sample. The silicon ion and fluoride concentrations from the respective batches are shown in Table 2.

TABLE 2

|  | Batch #1 | | Batch #2 | | Batch #3 | | Batch #4 | |
|---|---|---|---|---|---|---|---|---|
|  | Silicon | Fluoride | Silicon | Fluoride | Silicon | Fluoride | Silicon | Fluoride |
| New Acid | 0.11 | 1.3 | 0.22 | 2.3 | 0.31 | 2.7 | 0.27 | 2.5 |
| Fluoboric acid | 0.17 | 1.6 | 0.17 | 1.6 | 0.13 | 1.5 | 0.18 | 1.8 |
| 12/3 mud acid | 0.27 | 1.2 | 0.21 | 1.3 | 0.13 | 1.1 | 0.046 | 0.60 |
| 9/1 mud acid | 0.088 | 0.42 | 0.049 | 0.32 | 0.023 | 0.31 | 0.0087 | 0.33 |
| 3/1 mud acid | 0.083 | 0.46 | 0.052 | 0.44 | 0.047 | 0.38 | 0.036 | 0.34 |

EXAMPLE 3

A synthetic blend of 90% 100 mesh silica sand with 10% zeolite was used to simulate a subterranean formation containing HCl minerals, e.g. zeolite, typically found in the Gulf of Mexico. Samples were contacted individually with solutions, as follows: 9/1 HCl/HF, 3/1 HCl/HF, fluoboric acid, and New acid. The test procedure followed was the same as that of Example 1. The results of the tests are shown in Table 3.

TABLE 3

|  | Batch #1 | | Batch #2 | | Batch #3 | | Batch #4 | |
|---|---|---|---|---|---|---|---|---|
|  | Silicon | Fluoride | Silicon | Fluoride | Silicon | Fluoride | Silicon | Fluoride |
| New Acid | 0.070 | 1.0 | 0.15 | 1.6 | 0.27 | 2.6 | 0.37 | 2.9 |
| Fluoboric acid | 0.095 | 0.99 | 0.14 | 1.4 | 0.19 | 1.7 | 0.19 | 1.7 |
| 12/3 mud acid | 0.27 | 1.2 | 0.21 | 1.3 | 0.13 | 1.1 | 0.046 | 0.60 |
| 9/1 mud acid | 0.088 | 0.47 | 0.11 | 0.45 | 0.11 | 0.46 | 0.11 | 0.45 |
| 3/1 mud acid | 0.066 | 0.31 | 0.10 | 0.48 | 0.12 | 0.48 | 0.074 | 0.32 |

Figure 4:
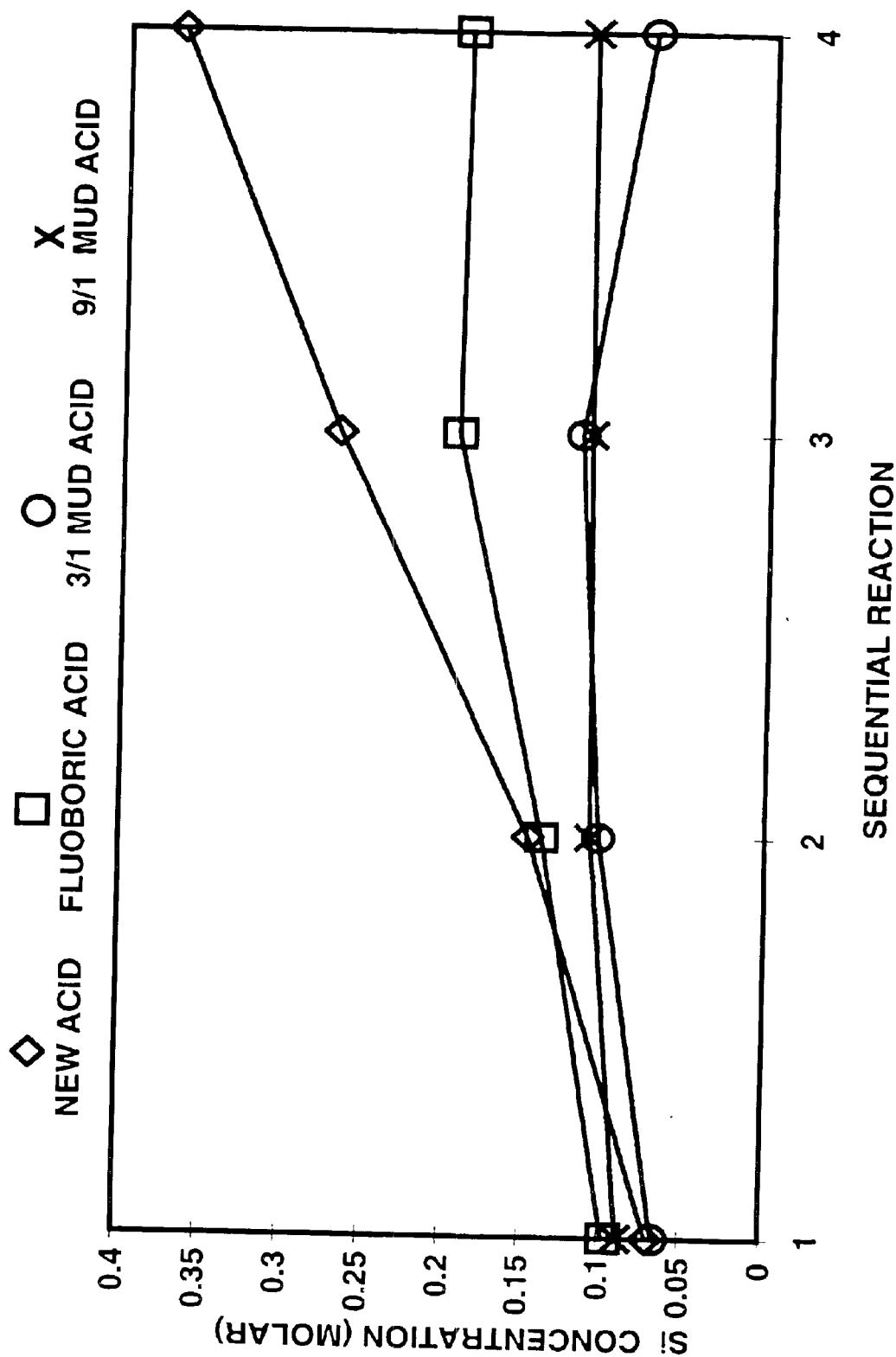
FIG. 4 is a graph illustrating silicon ion concentration in sequential spending effluents at 93° C.

FIG. 4 shows graphically that the concentrations of Si did not increase substantially from Batch #1 through Batch #4 utilizing mud acids.

However the New Acid continued to dissolve minerals and maintain the silicon ions in solution, and the silicon concentration in solution accumulated from samples extracted from Batch #1 through Batch #4.

Figure 5:
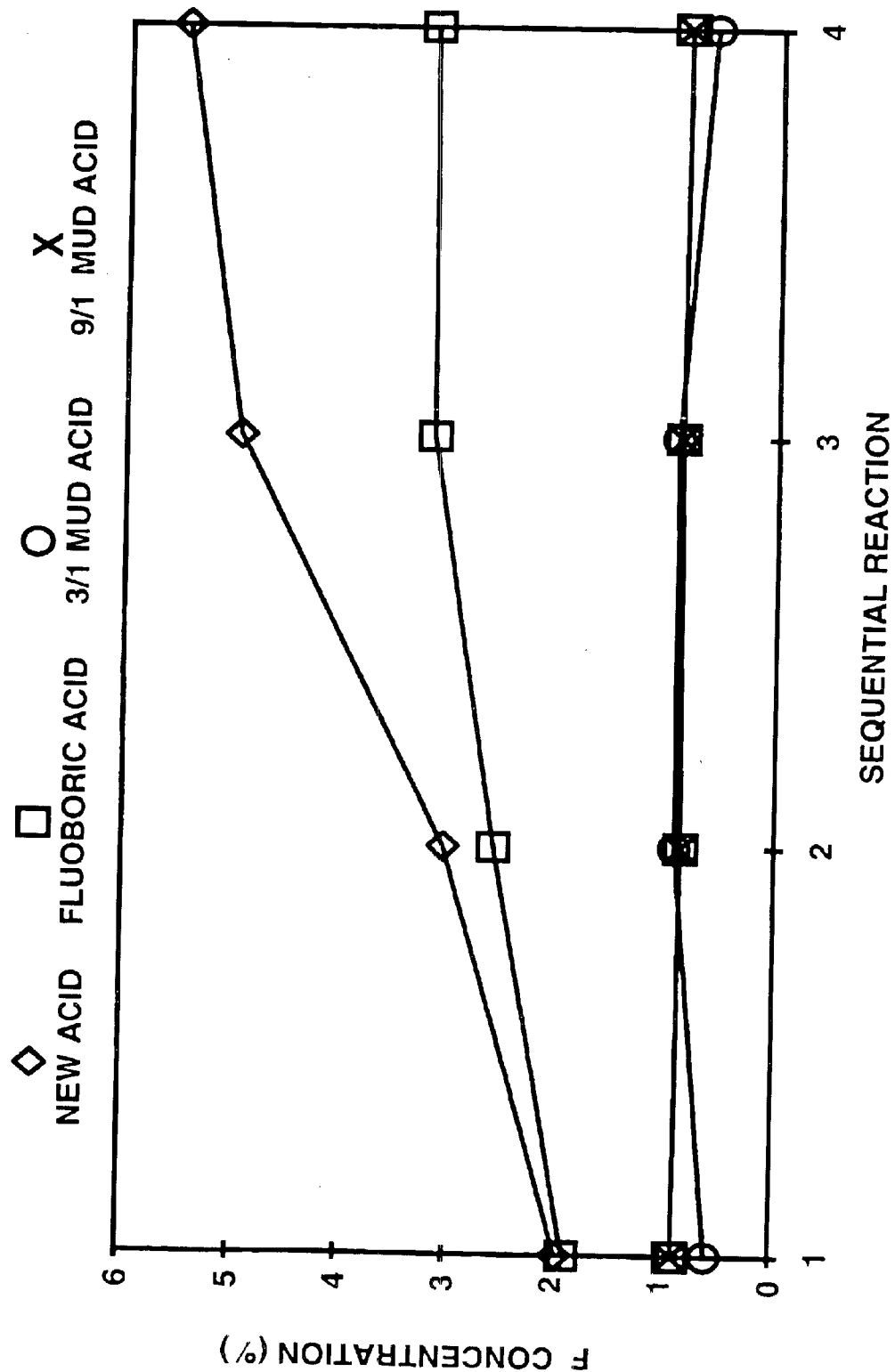
FIG. 5 is a graph illustrating fluoride ion concentration in sequential spending effluents at 93° C.

FIG. 5 shows that fluoride was continuously generated as the New Acid sequentially contacted the samples and the fluoride concentration therefore rose. On the other hand, the fluoride concentrations reached equilibrium rapidly with the mud acids, and the mud acids were unable to continue to dissolve minerals.

EXAMPLE 4

Figure 6:
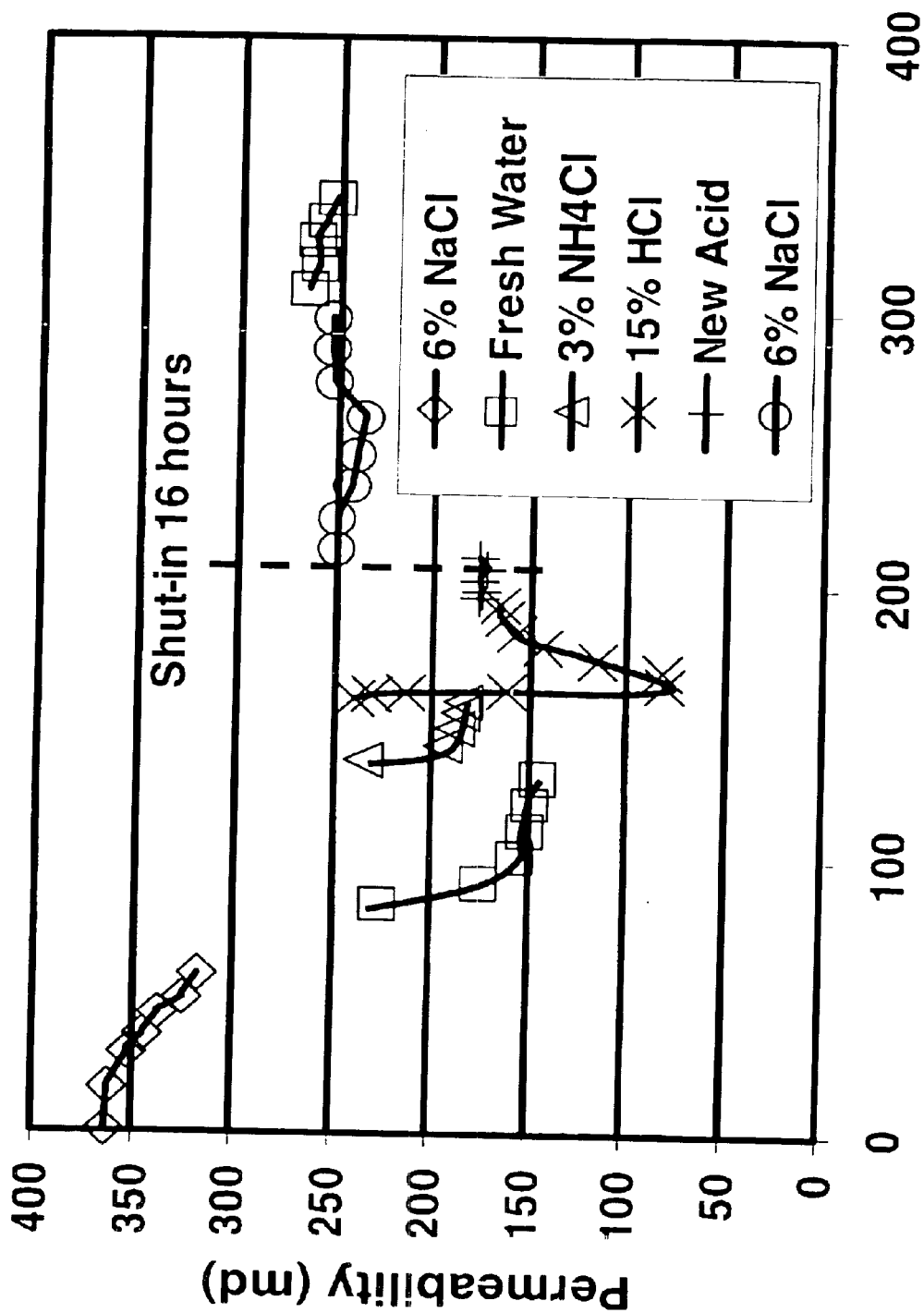
FIG. 6 is a graph illustrating core flow results showing damage removal by compositions and treatment according to the invention at 93° C.

In this example, a sandstone core containing 2% kaolinite clay was used. The core was sensitized by injection of 6% NaCl solution, then damaged by fresh water (FIG. 6). The core was then acidized by the following procedure. First, a 3% $NH_4Cl$ solution was injected through the core as preflush, followed by 15% HCl. The core was then treated with New Acid. No apparent increase of permeability was observed during the acid injection. The core was then shut in for 16 hours at about 90° C. The permeability was then measured again using 6% NaCl. A significant recovery of permeability was achieved. The 6% NaCl solution was again injected through the core to again sensitize the core. However, though fresh water was injected following the 6% NaCl in an attempt to again damage the core, no damage occurred, showing that the New Acid treatment successfully stabilized the core.

EXAMPLE 5

Long term spending tests were performed to investigate whether or not reaction byproducts which cause precipitants will potentially plug a sandstone matrix. Batches of solution and minerals were placed in a water bath set at about 81° C. temperature for 24 hours, and weight loss was measured as a function of time. If a batch showed weight gain during reaction, it was an indication that precipitation had occurred.

Weight loss measurements were also conducted to investigate the effect of acid solution volume to mineral mass ratio on reactions. The solid composition employed was a blend comprising 10% zeolite and 90% 100 mesh silica sand. The acid solutions used included New Acid, fluoboric acid, 9/1 HCl/HF mud acid, and 3/1 HCl/HF mud acid. The results are shown in Tables 4, 5, and 6.

Table 4
Wt. Loss % from initial 2.5 g of minerals (90% Silica sand+10% zeolite) reacting with 25 ml of acid

TABLE 4

| Wt. Loss % from Initial 2.5 g of minerals (90% Silica sand + 10% zeolite) reacting with 25 ml of acid | | | | |
|---|---|---|---|---|
| Time (hr) | New Acid | 9/1 mud acid | 3/1 mud acid | Fluoboric acid |
| 1 | 5.5 | 5.3 | 4.9 | 3.8 |
| 3 | 7.9 | 6.5 | 6.3 | 6.3 |
| 5 | 8.7 | 7.2 | 6.9 | 7.0 |
| 7 | 9.7 | 8.1 | 7.5 | 8.1 |
| 22–23 | 11.0 | 9.2 | 6.9 | 7.5 |
| 24 | 12.1 | 8.8 | 7.0 | 8.3 |

Table 5
Wt. Loss % from initial 5 g. of minerals (90% Silica sand+10% zeolite) reacting with 25 ml of acid

TABLE 5

| Wt. Loss % from Initial 5 g. of minerals (90% Silica sand + 10% zeolite) reacting with 25 ml of acid | | | | |
|---|---|---|---|---|
| Time (hr) | New Acid | 9/1 mud acid | 3/1 mud acid | Fluoboric acid |
| 1 | 3.5 | 4.5 | 4.0 | 3.5 |
| 3 | 4.9 | 4.5 | 5.0 | 3.9 |
| 5 | 5.8 | 4.9 | 4.7 | 4.7 |
| 7 | 6.3 | 4.9 | 5.1 | 5.7 |
| 22–23 | 9.4 | 4.7 | 5.2 | 6.4 |
| 24 | 10.1 | 4.7 | 5.5 | 6.8 |

Table 6
Wt. Loss % from initial 10 g. of minerals (90% Silica sand+10% zeolite) reacting with 25 ml of acid

TABLE 6

| Wt. Loss % from Initial 10 g. of minerals (90% Silica sand + 10% zeolite) reacting with 25 ml of acid | | | | |
|---|---|---|---|---|
| Time (hr) | New Acid | 9/1 mud acid | 3/1 mud acid | fluoboric acid |
| 1 | 2.2 | 2.8 | 3.2 | 2.5 |
| 3 | 3.2 | 2.7 | 3.3 | 2.9 |
| 5 | 3.3 | 2.7 | 3.2 | 2.3 |
| 7 | 3.3 | 3.1 | 2.8 | 1.9 |
| 22–23 | 5.0 | 3.1 | 3.2 | 3.5 |
| 24 | 4.9 | 3.3 | 2.9 | 4.0 |

Figure 7:
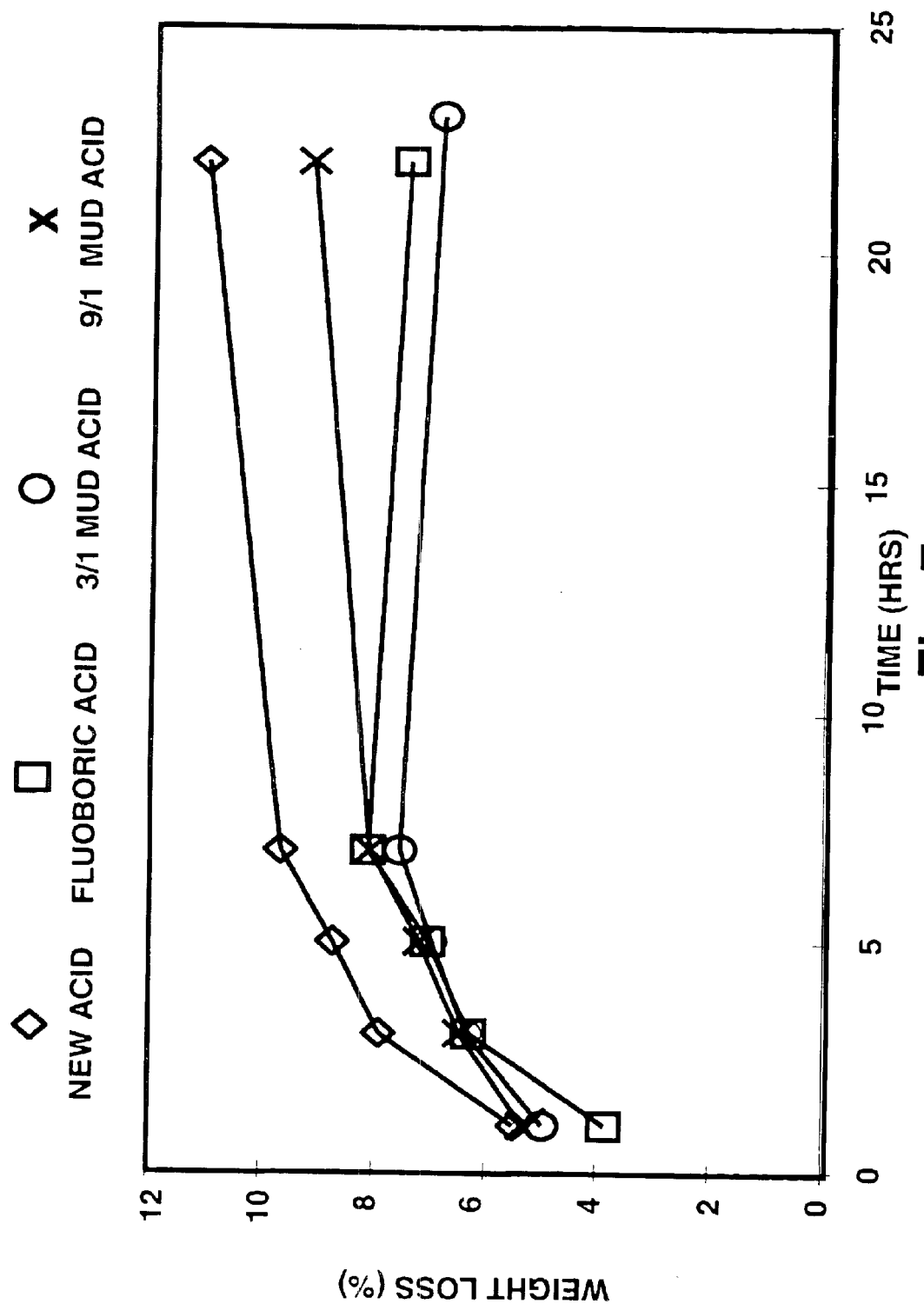
FIG. 7 is a graph illustrating weight loss over time by 2.5 g samples of solids contacted with conventional acids and a treatment composition of the invention.
Figure 8:
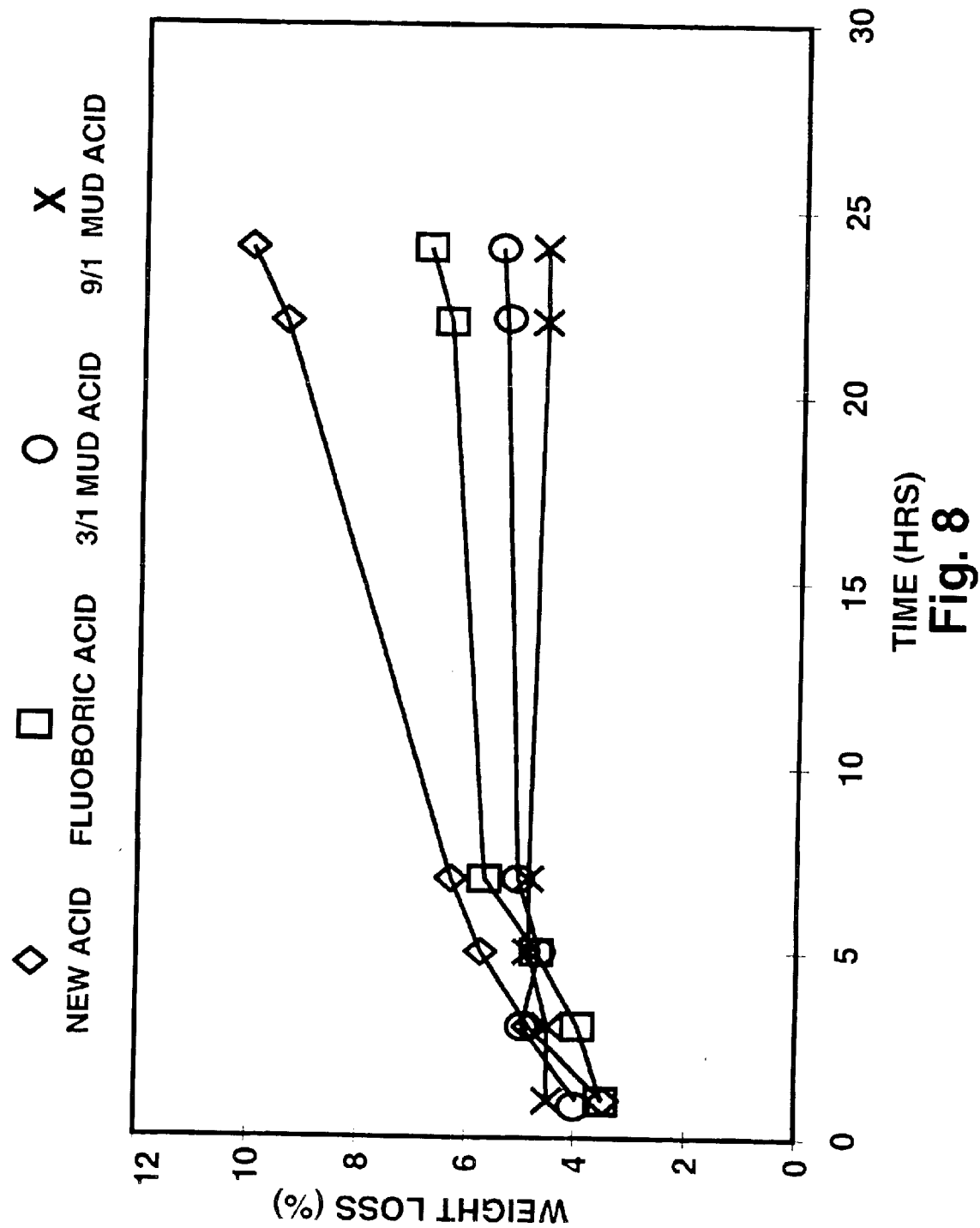
FIG. 8 is a graph illustrating weight loss over time by 5.0 g samples of solids contacted with conventional acids and a treatment composition of the invention.
Figure 9:
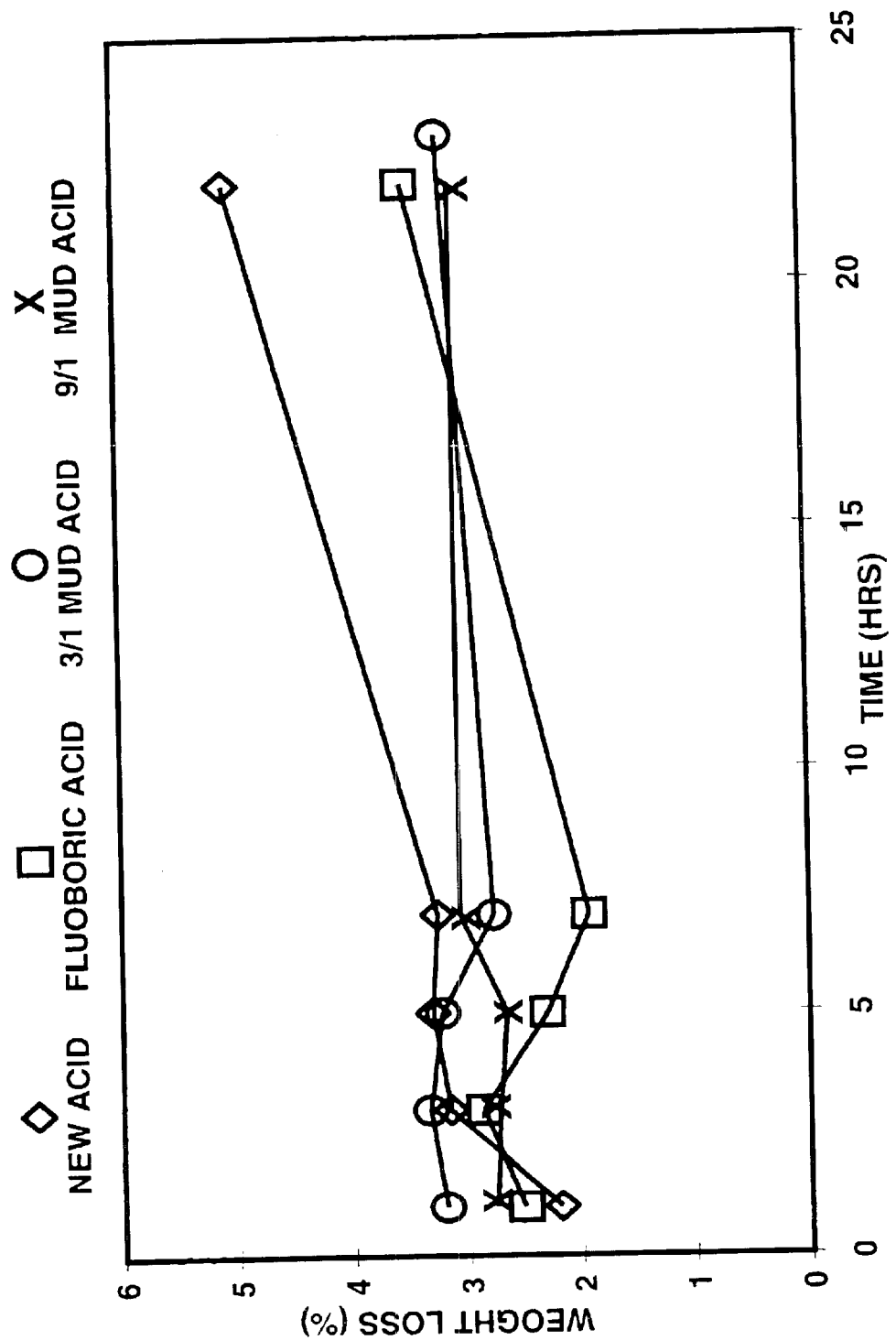
FIG. 9 is a graph illustrating weight loss over time by 10.0 g samples of solids contacted with conventional acids and a treatment composition of the invention.
Figure 10:
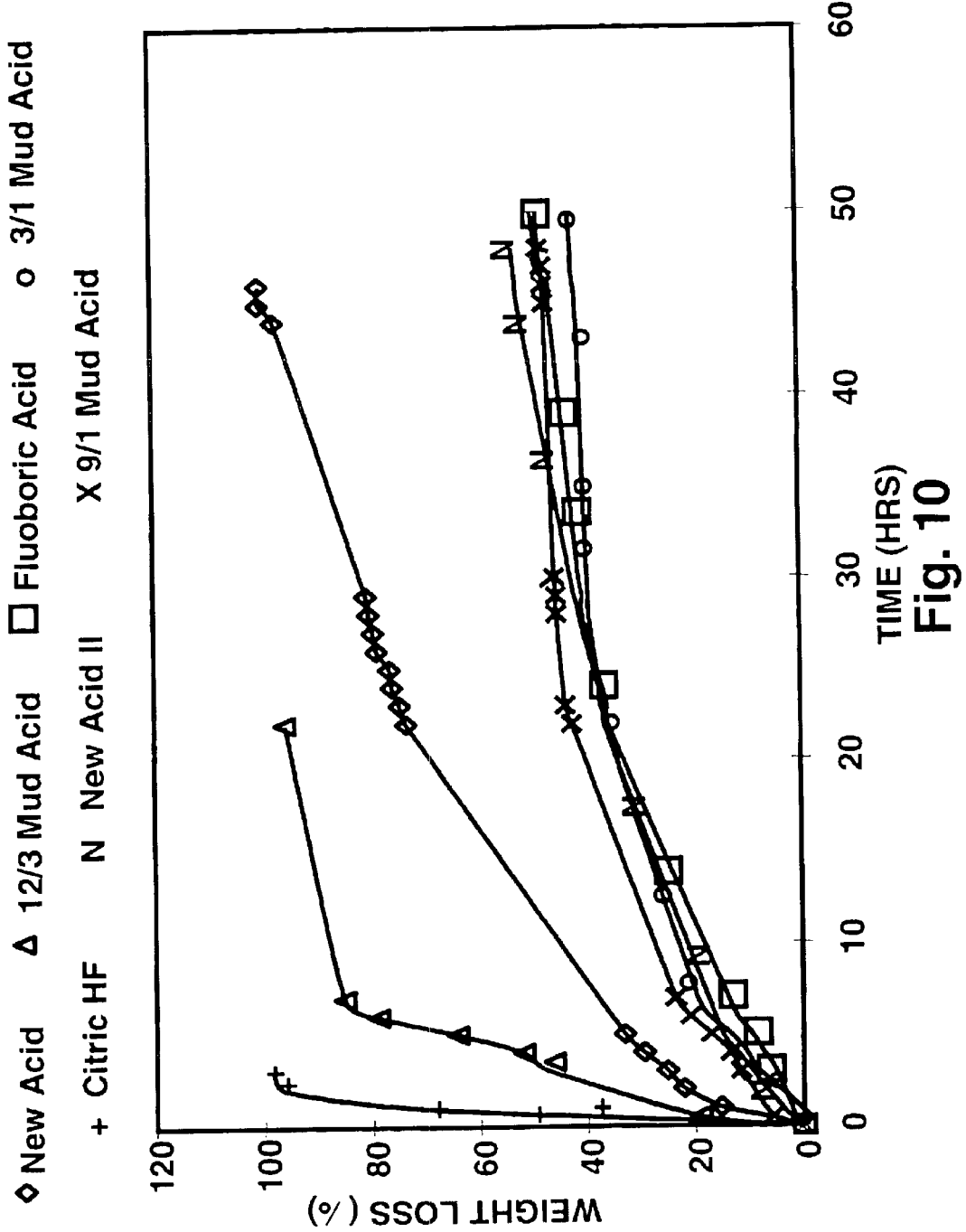
FIG. 10 is a graph illustrating weight loss of slides after contact with various HF containing acids, including two acids according to the invention.

Mud acids (9/1 and 3/1 HCl/HF) were rapidly spent, and became non-reactive shortly after acid-mineral contact. Potential weight gain due to precipitation was also observed. Fluoboric acid did slowly generate HF to sustain mineral dissolution. However, it caused precipitation by gaining weight during the reaction process. The New Acid continuously dissolved minerals, even at a low acid/mineral ratio (25 ml acid/2.5 g mineral (FIG. 7), no weight gain was seen, the precipitation potential was therefore minimal. FIGS. 7 through 9 show graphically the results of reacting 25 ml of acid with 2.5, 5, and 10 grams of solids. The results demonstrate that a chelating agent, citric acid, in the New Acid system was essential in preventing precipitation.

EXAMPLE 6

The long term weight loss of glass slides were measured by reacting various acid formulations with silica glass to determine the dissolving power of the acids. The tests were conducted at about 90° C. The acid solutions used in this series of tests include New Acid, fluoboric acid, 12/3, 9/1, 3/1 mud acids, and New Acid II. New Acid II was formulated by blending 13.4% N-(2-hydroxyethyl) ethylenediaminetriacetic acid, 9.8% ammonium bifluoride ($NH_4HF_2$), and 4.9% boric acid ($H_3BO_3$) in water. Two hundred fifty milliliters samples of each acid solution were respectively allowed to contact 4.5 gram silica glass slides for 48 hours. Each slide was then dried and weighed. The results of this procedure are shown in Table 7.

Table 1

TABLE 7

| Time (hr) | 12/3 mud acid | New Acid | Flouboric acid | 9/1 mud acid | 3/1 mud acid | New Acid II |
|---|---|---|---|---|---|---|
| 0 | 0.0 | 0.0 | 0.0 | 0.0 | 0.0 | 0.0 |
| 0.5 | 19.0 | 6.8 | 1.6 | 5.7 | 1.0 | 2.4 |
| 3 | 47.1 | 25.2 | 5.1 | 11.6 | 8.4 | 9.6 |
| 4 | 51.8 | 29.5 | 7.3 | 13.5 | 10.5 | 12.1 |
| 5 | 64.2 | 33.0 | 9.6 | 17.0 | 13.5 | 14.9 |
| 6 | 78.9 | | 12.3 | 20.9 | 17.5 | |
| 7 | 85.2 | | 13.9 | 23.6 | 19.5 | |
| 22 | 95.8 | 73.4 | 35.7 | 42.5 | 36.3 | 35.7 |
| 23 | 100.0 | 74.5 | 35.9 | 43.6 | 36.6 | 37.0 |
| 28 | | 80.1 | 40.3 | 45.1 | 39.1 | 40.9 |
| 29 | | 80.6 | 40.3 | 45.2 | 39.1 | 41.7 |
| 30 | | | 40.8 | 45.5 | 39.3 | 42.4 |
| 45 | | 97.3 | 46.0 | 47.0 | 41.0 | 51.9 |
| 46 | | | 46.0 | 47.2 | 41.4 | 52.2 |
| 47 | | | 48.4 | 47.3 | 41.7 | 52.6 |
| 48 | | | 48.4 | 47.9 | 41.7 | 52.8 |
| 50 | | | 49.4 | 48.3 | 42.2 | |

Table 7 shows that mud acids react rapidly with silica and then lose the strength needed to continue the reaction. The fluoboric acid continued to dissolve the silica throughout the 48 hour time period. The New Acid and the New Acid II exhibited sustained reaction power. Because the HEDTA in New Acid II is a higher molecular weight (M.W. 278) material, equivalent weight percent generated less molar of HF than the citric acid (M.W. 192) based New Acid. Accordingly, the reaction capability was diminished. The 13.4% citric acid generated about 2.2% HF, which is about 1.1 molar, upon initial mixing of the starting ingredients with a final generated amount of about 3.5% HF. The 13.4% HEDTA generated only about 0.75 molar of HF upon mixing of initial ingredients with a final generated amount of HF of about 2.5%.

EXAMPLE 7 (MAIN FLUID)

A subterranean formation with permeability from 60 to 500 md, containing 60% quartz, 9% dolomite, 10% zeolite, 5% smectite, 1% chlorite, 10% feldspar, and 5% albite is to be acidized to remove damage caused by clay swelling and dispersion. New Acid may be applied in the following manner to restore permeability. A preflush of 5% $NH_4Cl$ in a volume of 40 gallons per ft. of the subterranean formation penetrated by the wellbore is applied, followed by 5% acetic acid in a volume of 50 gallons per ft. of the subterranean formation penetrated by the well bore. The preflush is followed by the main treating fluid, New Acid, prepared by mixing 13% citric acid or HEDTA, 10% $NH_4HF_2$, and 2 to 5% $H_3BO_3$ water in a volume of 100 gallons per ft. of the formation. The main treating acid is followed by 5% acetic acid, in a volume of 50 gallons per ft. of the formation penetrated by the well bore, and finally displaced by 5% $NH_4Cl$ in a volume of 50 gallons per ft. of the formation penetrated by the well bore. Common additives, such as corrosion inhibitors, non-emulsifying agents, anti-sludging agents, and water wetting agents, may be used in the acetic acid and main acid stages.

EXAMPLE 8 (USED AS A PREFLUSH)

A subterranean formation containing 80% quartz, 10% illite, 2% calcite, and 3% feldspar, and 5% kaolinite is to be treated. The subterranean formation may be treated by a first preflush with 3% NH4Cl in a volume of 50 gallons per ft. of subterranean formation penetrated by the well bore. The formation may then be preflushed with New Acid (prepared by mixing 10% to 13% citric acid, 10% $NH_4HF_2$, and 2 to 5% $H_3BO_3$ in water) in a volume of 50 gallons per ft. of the subterranean formation penetrated by the well bore. The formation may then be treated with a 9/1 HCl/HF mud acid in a volume of 100 gallons per ft. of the subterranean formation penetrated by the well bore, followed by 15% HCl in a volume of 50 gallons per ft. of the formation penetrated by the well bore. Finally the HCl may be displaced by 3% $NH_4Cl$ in a volume of 50 gallons per ft. of the formation penetrated by the well bore.

EXAMPLE 9

In this example, a sandstone core containing trace to 5% zeolite was used. The core was saturated by injection of Ewing Bank Formation brine from the Gulf of Mexico. The core was then acidized by injecting first a 5% $NH_4Cl$ solution as preflush, followed by a second day re-injection of the 5% $NH_4Cl$ solution. The core was then treated with an acid solution comprising 10% citric acid and 1.5% hydrofluoric acid. The core flow procedure was, as follows:

(1) The unconsolidated sand from the formation was packed into a 1" in diameter by 12" in length core holder, and the core was heated to about 61° C.

(2) A 300 ml quantity of Ewing Bank formation brine was injected through the core at 10 ml/min.

(3) The brine injection was followed by injection of 300 ml of 5% $NH_4Cl$ through the core, also at 10 ml/min.

(4) The acid solution to be tested was injected at 300 ml of acid through the core at 10 ml/min.

(5) Test acid solution injection was followed by injection of 300 ml of 5% $NH_4Cl$ through the core at 10 ml/min.

(6) Finally, 300 ml of fresh water was injected through the core at 10 ml/min.

The differential pressure across the core was measured through all stages of fluid injection so the change of permeability could be monitored. When the test acid solution was injected through the core, the test solution yielded a flat but slightly downward trend in permeability response. The final permeability measured by 5% $NH_4Cl$ and fresh water showed the core had lower permeability than it initially had.

Figure 11:
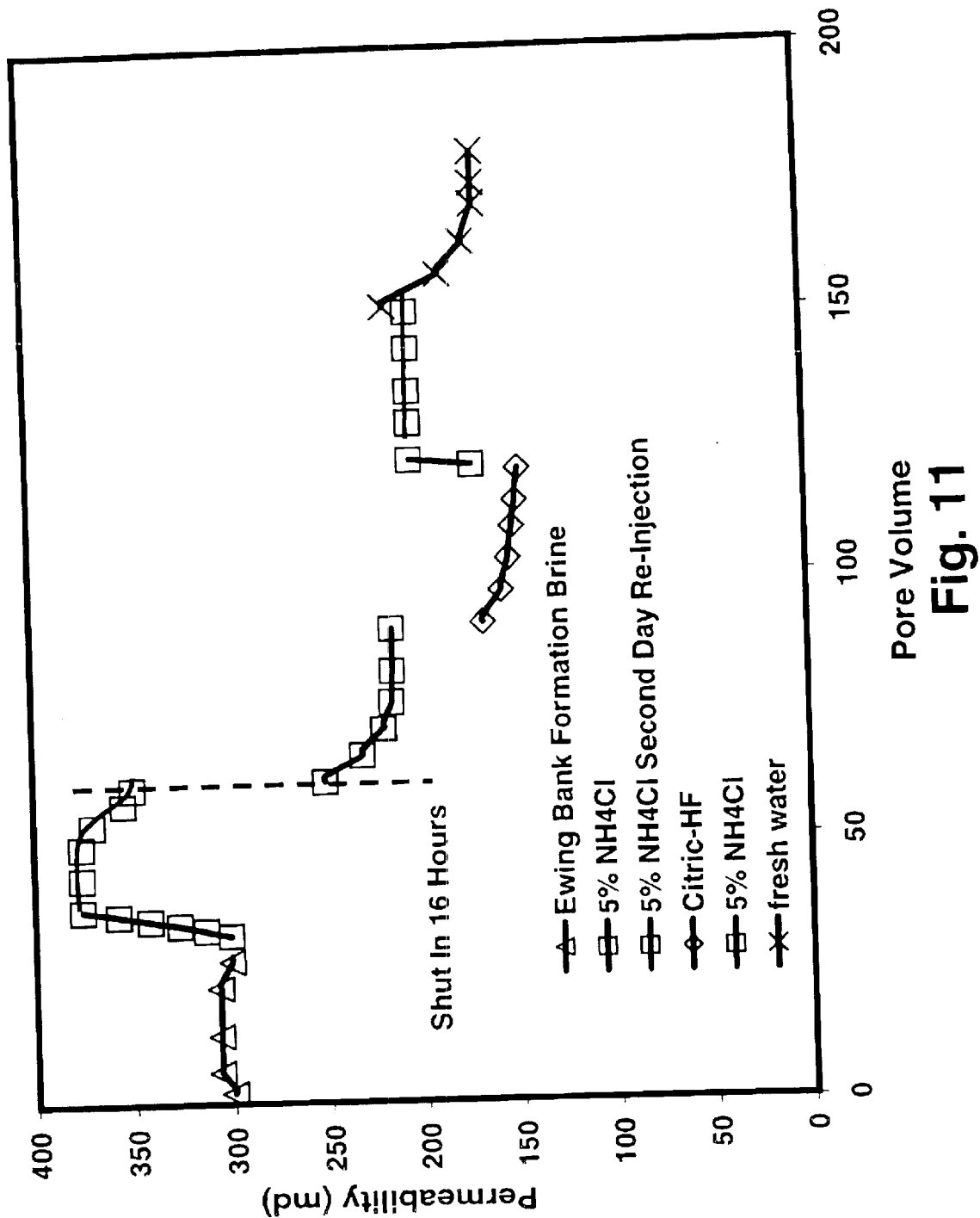
FIG. 11 is a graph illustrating results of permeability tests described hereinafter in example 9.

No apparent increase of permeability was observed during the citric-HF acid injection. The permeability was then measured again upon injection of 5% $NH_4Cl$ solution. A recovery of permeability was achieved. The 5% $NH_4Cl$ solution was again injected to sensitize the core. However, though tap water was injected following the injection of 5% $NH_4Cl$ solution in an attempt to again damage the core, no damage occurred showing that citric-HF acid successfully stabilized the core. The results are shown graphically in FIG. 11.

EXAMPLE 10

Figure 12:
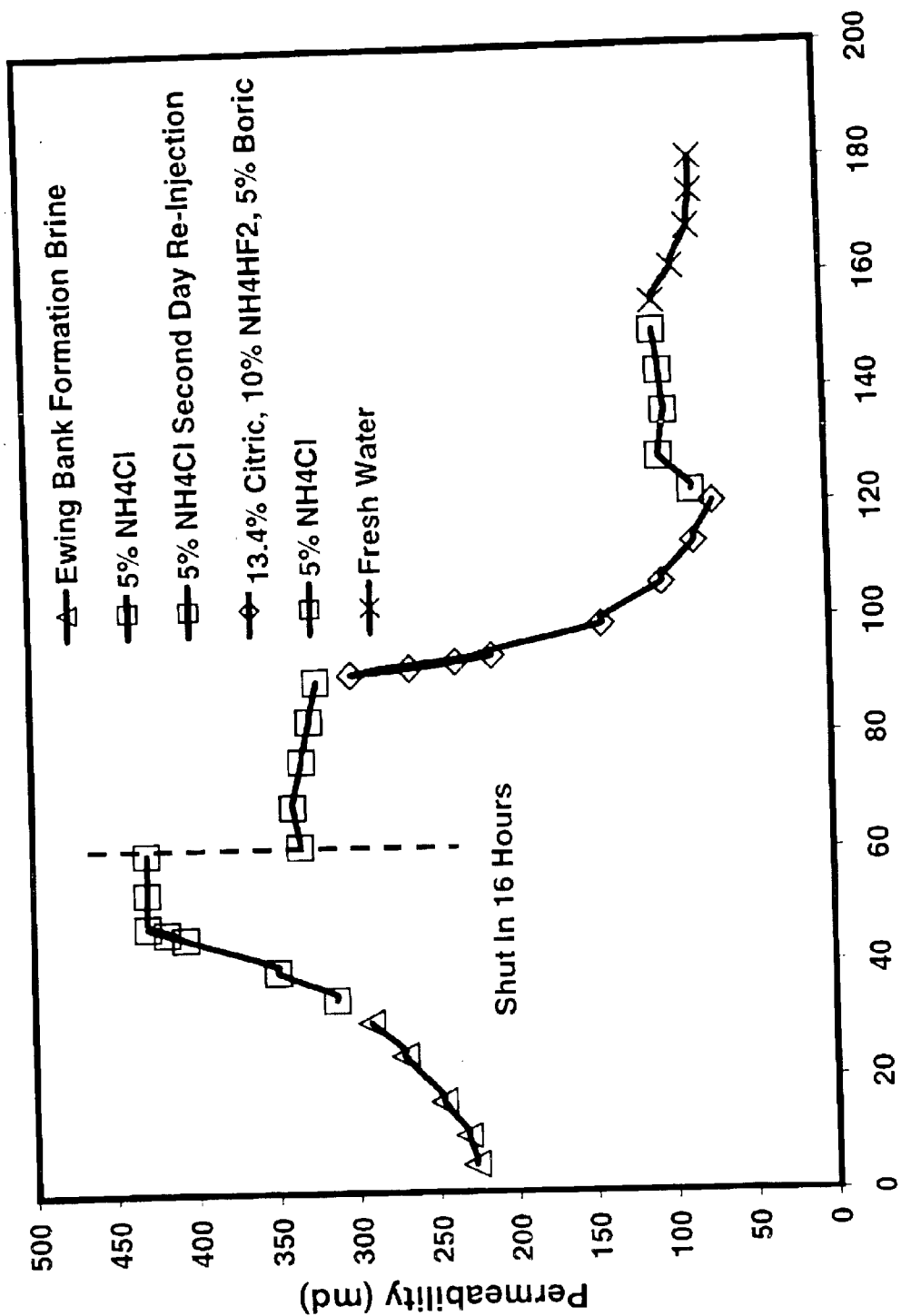
FIG. 12 is a graph illustrating results of permeability tests described hereinafter in example 10.

The procedure of Example 9 was repeated, except that the acid solution to be tested contained 13.4% citric acid, 10% ammonium bifluoride, and 5% boric acid. When the test acid solution was injected through the core, the acid yielded a continuous downward trend in permeability response. The final permeability measured by 5% NH4Cl and fresh water showed the core had much lower permeability than it initially had. The results are shown graphically in FIG. 12.

EXAMPLE 11

Figure 13:
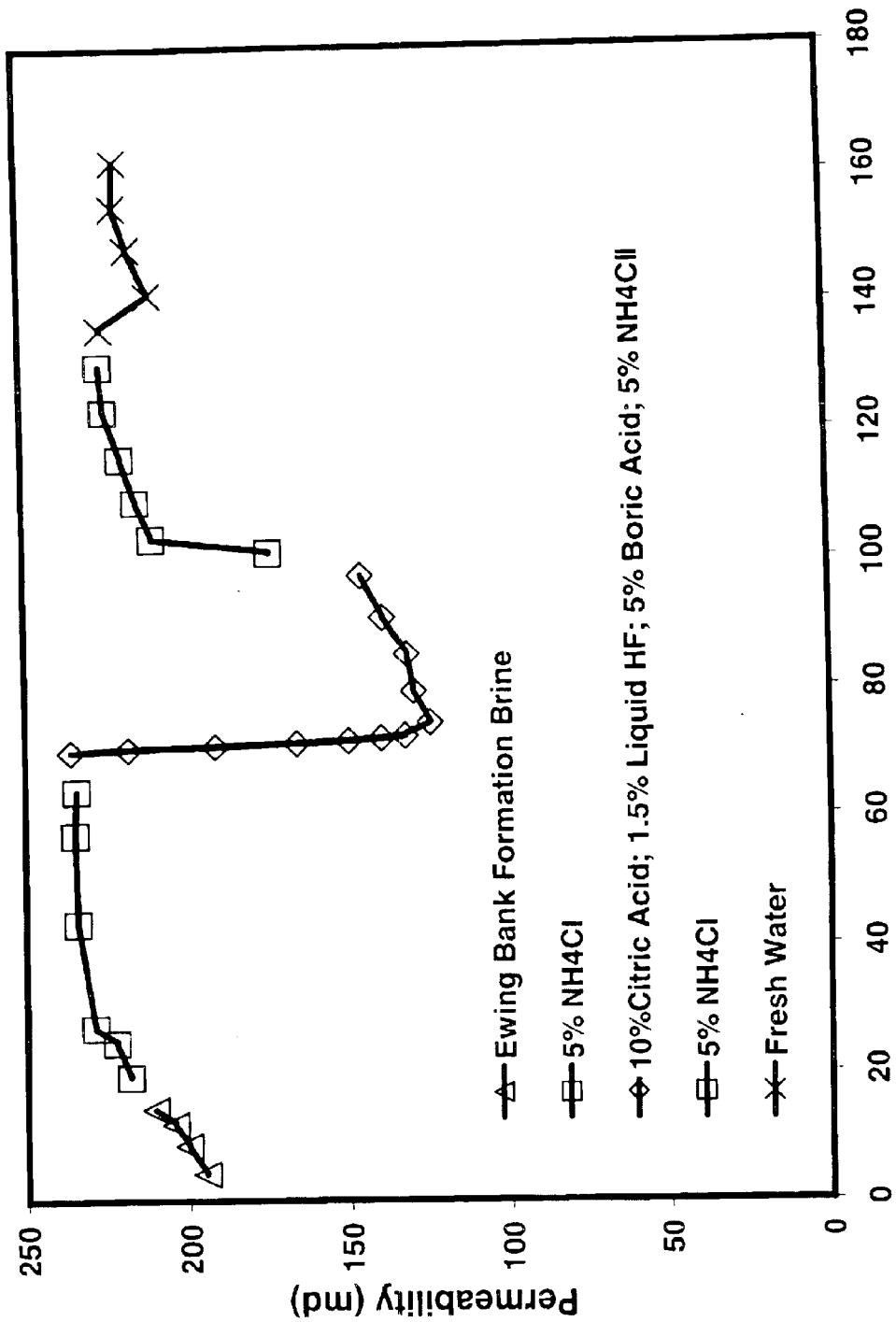
FIG. 13 is a graph illustrating results of permeability tests described hereinafter in example 11.

The procedure of Example 8 was repeated, except that the acid solution comprised 10% citric acid, 5% boric acid, 1.5% hydrofluoric acid and 5% NH$_4$Cl. No significant increase of permeability was observed during the acid solution injection. The permeability was then measured again upon injecting 5% NH$_4$Cl solution. A significant recovery of permeability was achieved. The 5% NH$_4$Cl solution was again injected to sensitize the core. However, though tap water was injected following the injection of 5% NH$_4$Cl solution in an attempt to again damage the core, no damage occurred. The results are shown graphically in FIG. 13.

EXAMPLE 12

Figure 14:
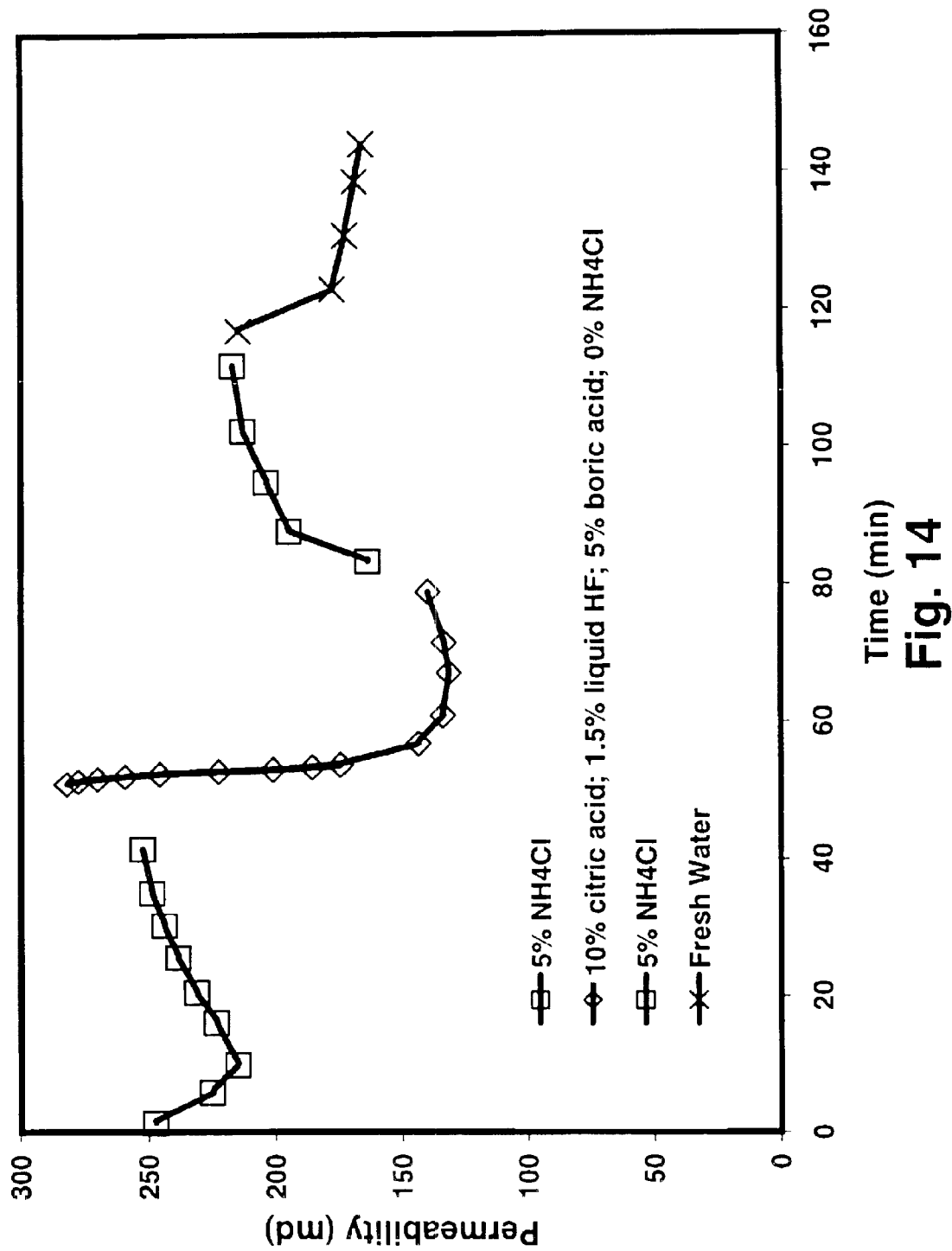
FIG. 14 is a graph illustrating results of permeability tests described hereinafter in example 12.

The procedure of Example 10 was repeated, except that the acid solution to be tested contained 10% citric acid, 1% HF and 5% boric acid. When the test acid solution was injected through the core, the acid yielded an increasing permeability trend as the injection progressed. The final permeability measured by 5% NH4Cl and fresh water showed the core had lower permeability than it initially had. The results are shown graphically in FIG. 14.

EXAMPLE 13

Figure 15:
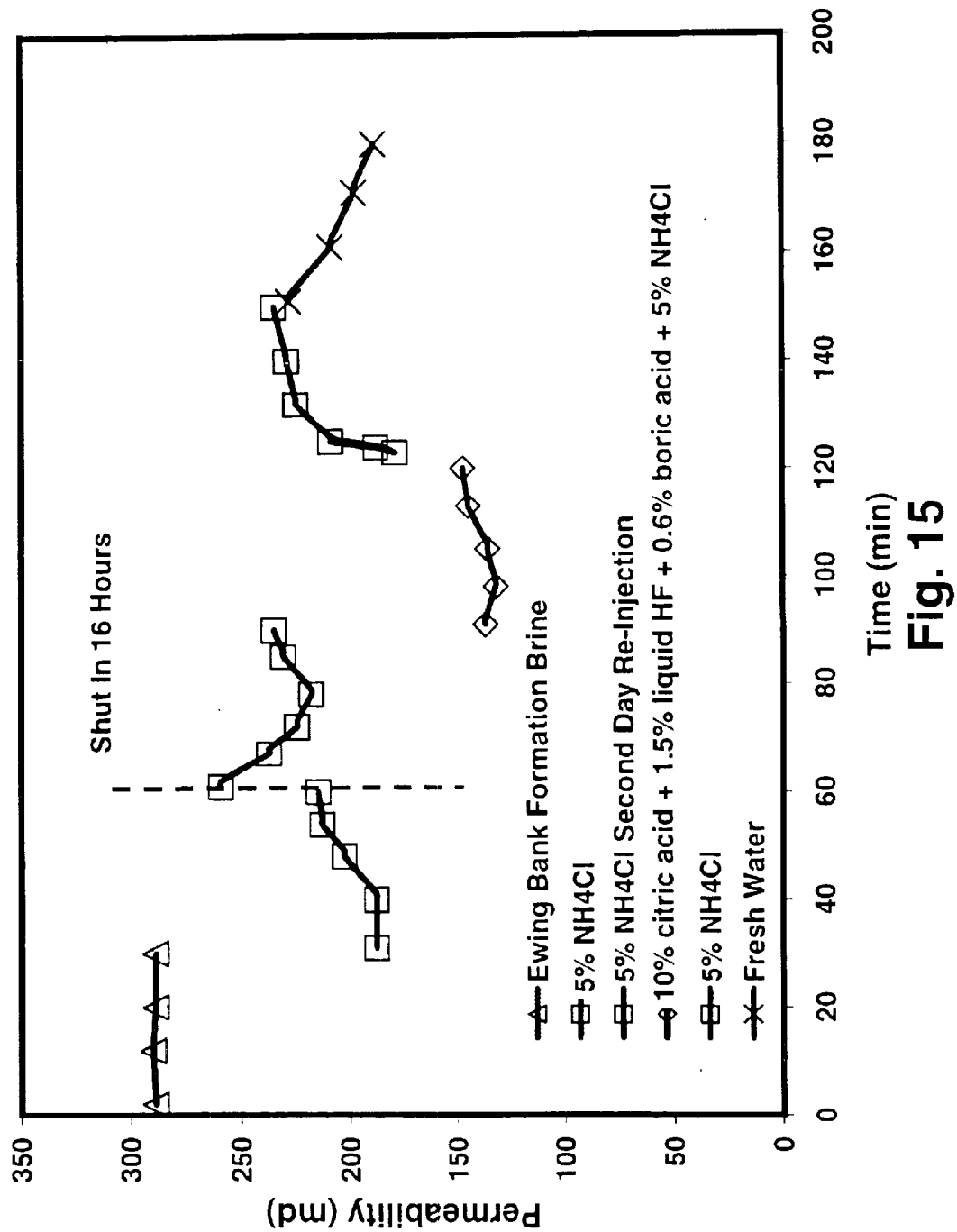
FIG. 15 is a graph illustrating results of permeability tests described hereinafter in example 13.

The procedure of Example 10 was repeated, except that the acid solution to be tested contained 10% citric acid, 1.5% HF, 0.6% boric acid, and 5% NH$_4$Cl. When the test acid solution was injected through the core, the acid yielded an increasing permeability trend as the injection progressed. The final permeability measured by 5% NH4Cl and fresh water showed the core permeability was equal to its initial value. The results are shown graphically in FIG. 15.

While the compositions of the invention have been described generally in relation to the treatment of subterranean formations for permeability, they may also be employed for increasing the permeability of a proppant pack, present in a fracture in a subterranean formation, whose permeability has been reduced by fines, particles, or bridging. Concentrations and conditions of application in such a procedure are identical or analogous to those employed in treating a subterranean formation. For example, the concentrations of fluoboric acid or BF$_4^-$ anion will be effective to increase the permeability of the proppant pack.

What is claimed is:

1. A composition for treating a subterranean formation comprising an aqueous acidic mixture having pH of less than 2 formed by blending an aqueous liquid; an amount of fluoboric acid sufficient to provide from 1 to 20 percent BF$_4^-$ anion; and an effective amount of an acid, or mixture of acids, which chelate aluminum ions and aluminum fluoride species, selected from the group consisting of citric acid, malic acid, N-(2-hydroxyethyl)ethylenediaminetriacetic acid, an ammonium or potassium salt or salts of such acids, or a mixture thereof.

2. The composition of claim 1 in which non-interfering ionic species are present in an amount effective to provide an ionic strength for the aqueous mixture sufficient to inhibit migration of clay particles.

3. A composition for treating a subterranean formation comprising an aqueous acidic mixture having a pH of less than 2 formed by blending an aqueous liquid; amounts of a fluoride ion source and a boron source sufficient to provide a concentration of BF$_4^-$ anion effective to provide from 1 to 20 percent BF$_4^-$ anion; and an effective amount of an acid, or mixture of acids, which chelate aluminum ions and aluminum fluoride species, selected from the group consisting of citric acid, malic acid, N-(2-hydroxyethyl) ethylenediaminetriacetic acid, or an ammonium or potassium salt or salts of such acids, or a mixture thereof.

4. The composition of claim 3 in which non-interfering ionic species are present in an amount effective to provide an ionic strength for the aqueous mixture sufficient to inhibit migration of clay particles.

5. A composition for treating a subterranean formation comprising an aqueous mixture formed by blending at a pH of less than 2 an aqueous liquid, amounts of HCl, a fluoride ion source, and a boron source sufficient to provide a concentration of BF$_4^-$ anion effective to increase the permeability of the formation, and an effective amount of an acid, or mixture of acids, which chelate aluminum ions and aluminum fluoride species, selected from the group consisting of citric acid, malic acid, N-(2-hydroxyethyl) ethylenediaminetriacetic acid, an ammonium or potassium salt or salt of such acids, or a mixture thereof.

6. The composition of claim 5 in which the aqueous mixture comprises from 1 to 20 percent BF$_4^-$ anion.

7. The composition of claim 5 in which non-interfering ionic species are present in an amount effective to provide an ionic strength for the aqueous mixture sufficient to inhibit migration of clay particles.

8. A method of treating a subterranean formation to increase permeability comprising injecting into the formation an effective amount of an aqueous acidic mixture formed at a pH of less than 2 by blending an aqueous liquid, an amount of fluoboric acid sufficient to increase the permeability of the formation, and an effective amount of an acid, or mixture of acids, which chelate aluminum ions and aluminum fluoride species, selected from the group consisting of citric acid, malic acid, N-(2-hydroxyethyl) ethylenediaminetriacetic acid, or an ammonium or potassium salt or salts of such acids, or a mixture thereof.

9. The method of claim 8 in which the aqueous mixture comprises from 1 to 20 percent BF$_4^-$ anion.

10. The method of claim 8 in which non-interfering ionic species are present in an amount effective to provide an ionic strength for the aqueous mixture sufficient to inhibit migration of clay particles.

11. A method of treating a subterranean formation to increase permeability comprising injecting into the formation an effective amount of an aqueous acidic mixture formed at a pH of less than 2 by blending an aqueous liquid, and amounts of a fluoride ion source and a boron source sufficient to provide a concentration of BF$_4^-$ anion effective to increase the permeability of the formation, and an effective amount of an acid, or mixture of acids, which chelate aluminum ions and aluminum fluoride species selected from the group consisting of citric acid, malic acid, N-(2-hydroxyethyl)ethylenediaminetriacetic acid, or an ammonium or potassium salt or salts of such acids, or a mixture thereof.

12. The method of claim 11 in which the aqueous mixture comprises from 1 to 20 percent BF$_4^-$ anion.

13. The method of claim 11 in which non-interfering ionic species are present in an amount effective to provide an ionic strength for the aqueous mixture sufficient to inhibit migration of clay particles.

14. A method of treating a subterranean formation to increase permeability comprising injecting into the formation an effective amount of an aqueous acidic mixture formed at a pH of less than 2 by blending an aqueous liquid, amounts of HCl, a fluoride ion source, and a boron source sufficient to provide a concentration of BF$_4^-$ anion effective to increase the permeability of the formation, and an effective amount of an acid, or mixture of acids, which chelate aluminum ions and aluminum fluoride species, selected from the group consisting of citric acid, malic acid, N-(2- hydroxyethyl)ethylenediaminetriacetic acid, or an ammonium or potassium salt or salts of such acids, or a mixture thereof.

15. The method of claim 14 in which the aqueous mixture comprises from 1 to 20 percent $BF_4^-$ anion.

16. The method of claim 14 in which non-interfering ionic species are present in an amount effective to provide an ionic strength for the aqueous mixture sufficient to inhibit migration of clay particles.

17. A composition for treating a proppant pack in a fracture in a subterranean formation comprising an aqueous acidic mixture formed at a pH of less than 2 by blending an aqueous liquid; an amount of fluoboric acid sufficient to provide from 1 to 20 percent $BF_4^-$ anion; and an effective amount of an acid, or mixture of acids, which chelate aluminum ions and aluminum fluoride species, selected from the group consisting of citric acid, malic acid, N-(2-hydroxyethyl)ethylenediaminetriacetic acid, or an ammonium or potassium salt or salts of such acids, or a mixture thereof.

18. A method of treating a proppant pack in a fracture in a subterranean formation to increase permeability of the proppant pack comprising injecting into the proppant pack an effective amount of an aqueous acidic mixture formed at a pH of less than 2 by blending an aqueous liquid, an amount of fluoboric acid sufficient to increase the permeability of the proppant pack, and an effective amount of an acid, or mixture of acids, which chelate aluminum ions and aluminum fluoride species, selected from the group consisting of polycarboxylic acids, polyaminopolycarboxylic acids, an ammonium or potassium salt or salts of such acids, and a mixture thereof.

\* \* \* \* \*